(12) United States Patent
Kakutani

(10) Patent No.: US 11,212,116 B2
(45) Date of Patent: Dec. 28, 2021

(54) INFORMATION PROCESSING APPARATUS, CONTROL METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Naoya Kakutani, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 16/001,645

(22) Filed: Jun. 6, 2018

(65) Prior Publication Data

US 2018/0359102 A1 Dec. 13, 2018

(30) Foreign Application Priority Data

Jun. 8, 2017 (JP) .............................. JP2017-113631

(51) Int. Cl.
| | | |
|---|---|---|
| *H04L 29/06* | (2006.01) | |
| *H04L 9/32* | (2006.01) | |
| *G06F 21/33* | (2013.01) | |
| *H04L 9/00* | (2006.01) | |
| *H04L 9/08* | (2006.01) | |

(52) U.S. Cl.
CPC ............ *H04L 9/3268* (2013.01); *G06F 21/33* (2013.01); *H04L 9/006* (2013.01); *H04L 9/0825* (2013.01); *H04L 63/0823* (2013.01)

(58) Field of Classification Search
CPC ..... H04L 9/3268; H04L 9/0825; H04L 9/006; H04L 63/0823; G06F 21/33
USPC ................................................. 713/158, 168
See application file for complete search history.

(56) References Cited

U.S. PATENT DOCUMENTS

| | | | | |
|---|---|---|---|---|
| 2007/0234059 A1* | 10/2007 | Ohara | ................... | H04L 9/3268 |
| | | | | 713/176 |
| 2008/0120506 A1* | 5/2008 | Yamauchi | ............. | H04L 9/3263 |
| | | | | 713/176 |
| 2009/0216785 A1* | 8/2009 | Sato | ................... | H04N 1/00209 |
| 2010/0268942 A1* | 10/2010 | Hernandez-Ardieta | | ..................... |
| | | | | H04L 9/006 |
| | | | | 713/156 |
| 2011/0161662 A1 | 6/2011 | Lee et al. | | |

FOREIGN PATENT DOCUMENTS

| | | |
|---|---|---|
| CN | 101026456 A | 8/2007 |
| CN | 101188649 A | 5/2008 |
| CN | 1013394615 A | 3/2009 |
| CN | 101645889 A | 2/2010 |
| CN | 101741848 A | 6/2010 |
| CN | 101895847 A | 11/2010 |
| CN | 101931532 A | 12/2010 |
| CN | 101977193 A | 2/2011 |
| CN | 102118374 A | 7/2011 |

(Continued)

OTHER PUBLICATIONS

Santosh Chokhani, et al., Internet X.509 Public Key Infrastructure Certificate Policy and Certification Practices Framework, 2003, pp. 1-94, Document No. RFC 3647, https://www.ipa.go.jp/security/rfc/RFC3647JA.html.

*Primary Examiner* — Evans Desrosiers

(74) *Attorney, Agent, or Firm* — Canon U.S.A., Inc. I.P. Division

(57) ABSTRACT

An information processing apparatus automatically deletes an electronic certificate according to acquisition of another electronic certificate.

14 Claims, 21 Drawing Sheets

(56) References Cited

FOREIGN PATENT DOCUMENTS

| | | | |
|---|---|---|---|
| CN | 102137209 | A | 7/2011 |
| CN | 103346916 | A | 10/2013 |
| CN | 105279404 | A | 1/2016 |
| JP | 2002-215826 | A | 8/2002 |
| JP | 2005-39790 | A | 2/2005 |
| JP | 2010177744 | A | 8/2010 |
| JP | 2013223171 | A | 10/2013 |
| JP | 2016-178458 | A | 10/2016 |

\* cited by examiner

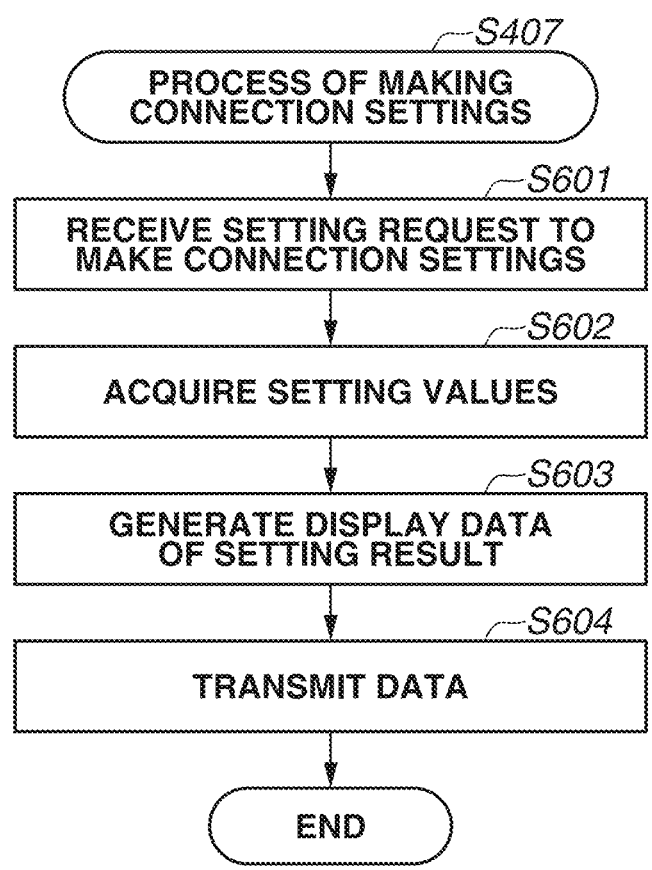

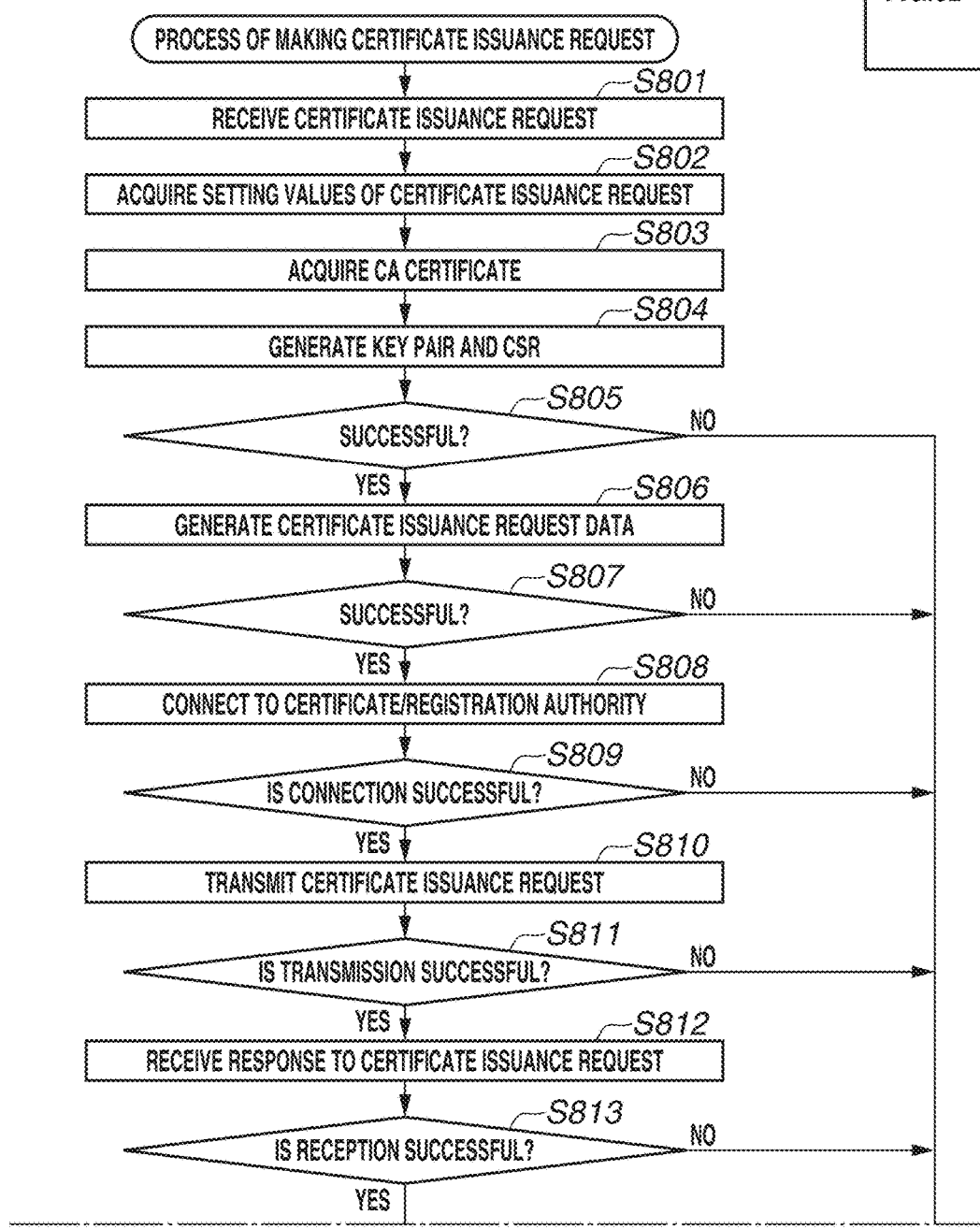

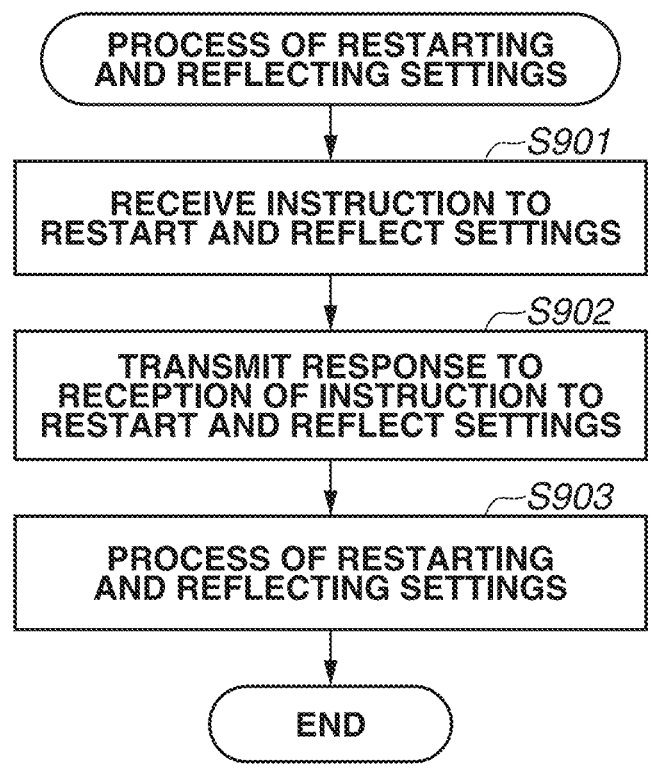

FIG.10A

CERTIFICATE ACQUISITION REQUEST/SETTING SCREEN

CERTIFICATE LIST ~1002
CONNECTION SETTINGS ~1003
CA CERTIFICATE ACQUISITION
CERTIFICATE ISSUANCE REQUEST
1004

CERTIFICATE LIST

| NAME ~1011 | PURPOSE ~1012 | ISSUER ~1013 | END DATE OF PERIOD OF VALIDITY ~1014 | DETAILS ~1015 |
|---|---|---|---|---|
| Xyz1 | TLS | CA001 | 2020/1/1 | ☼ |
| Xyz2 | IPSEC | CA001 | 2036/1/1 | ☼ |
| Xyz3 | IEEE802.1X | CA001 | 2025/1/1 | ☼ |

FIG.10B

CERTIFICATE ACQUISITION REQUEST/SETTING SCREEN

CERTIFICATE LIST
CONNECTION SETTINGS
CA CERTIFICATE ACQUISITION
CERTIFICATE ISSUANCE REQUEST

CONNECTION SETTINGS

SERVER NAME: http://xyz1.abc.co.jp/xxxxxxx/yyyyy ~1016

PORT NUMBER: 80 ~1017

SETTING ~1018

FIG.11A

CERTIFICATE ACQUISITION REQUEST/SETTING SCREEN

CERTIFICATE LIST

CONNECTION SETTINGS

CA CERTIFICATE ACQUISITION

CERTIFICATE ISSUANCE REQUEST

CONNECTION SETTINGS

SERVER NAME: http://xyz1.abc.co.jp/xxxxxxx/yyyyy

PORT NUMBER: 80

[SETTING]

SETTINGS ARE REELECTED. ~1101

FIG.11B

CERTIFICATE ACQUISITION REQUEST/SETTING SCREEN

CERTIFICATE LIST

CONNECTION SETTINGS

CA CERTIFICATE ACQUISITION

CERTIFICATE ISSUANCE REQUEST

CA CERTIFICATE ACQUISITION

CA CERTIFICATE ACQUISITION  [EXECUTION] ~1102

FIG.12A

CERTIFICATE ACQUISITION REQUEST

CERTIFICATE LIST

CONNECTION SETTINGS

CA CERTIFICATE ACQUISITION

CERTIFICATE ISSUANCE REQUEST

CA CERTIFICATE ACQUISITION

CA CERTIFICATE ACQUISITION    [EXECUTION]

1201

FOLLOWING CA CERTIFICATE IS ACQUIRED AND REGISTERED AS THAT FROM TRUSTED CERTIFICATE AUTHORITY.

THUMBPRINT OF CERTIFICATE (SHA-1):
0F 02 0F 03 0F 04 0F 05 0F 06 0F 07 0F 08 0F 09 0F 0A 0F 0B

FIG.12B

CERTIFICATE ACQUISITION REQUEST/SETTING SCREEN

CERTIFICATE LIST

CONNECTION SETTINGS

CA CERTIFICATE ACQUISITION

CERTIFICATE ISSUANCE REQUEST

CA CERTIFICATE ACQUISITION

CA CERTIFICATE ACQUISITION    [EXECUTION]

ACQUISITION OF CA CERTIFICATE IS FAILED. — 1202

FIG.13A

CERTIFICATE ACQUISITION REQUEST/SETTING SCREEN

CERTIFICATE LIST
CONNECTION SETTINGS
CA CERTIFICATE ACQUISITION
CERTIFICATE ISSUANCE REQUEST

TRANSMISSION OF CERTIFICATE ISSUANCE REQUEST

NAME: Xyz4 ~1301

LENGTH OF KEY ○1024bit ●2048bit ○3072bit ○4096bit ~1302

INPUT OF ISSUANCE DESTINATION INFORMATION ~1303

COUNTRY NAME: JP
PREFECTURE:
MUNICIPALITY:
ORGANIZATION: ABC
ORGANIZATION UNIT: DEV01
COMMON NAME: Device001

SIGNATURE VERIFICATION ●YES ○NO ~1304
PURPOSE OF KEY ☑TLS ☐IPSEC ☐IEEE802.1X ~1305
PASSWORD: ABCDEFG12345 ~1306

[EXECUTION] ~1307

FIG.13B

CERTIFICATE ACQUISITION REQUEST/SETTING SCREEN

CERTIFICATE LIST
CONNECTION SETTINGS
CA CERTIFICATE ACQUISITION
CERTIFICATE ISSUANCE REQUEST

TRANSMISSION OF CERTIFICATE ISSUANCE REQUEST

1308
ISSUANCE AND ACQUISITION OF CERTIFICATE ARE SUCCESSFUL.
PLEASE CONFIRM ISSUED CERTIFICATE IN CERTIFICATE LIST.
PLEASE RESTART DEVICE TO REFLECT SETTINGS.

[RESTART] ~1309

FIG.14A

| CERTIFICATE ACQUISITION REQUEST/SETTING SCREEN | |
|---|---|
| CERTIFICATE LIST<br><br>CONNECTION SETTINGS<br><br>CA CERTIFICATE ACQUISITION<br><br>CERTIFICATE ISSUANCE REQUEST | TRANSMISSION OF CERTIFICATE ISSUANCE REQUEST<br><br>ISSUANCE AND ACQUISITION OF CERTIFICATE ARE FAILED.<br>1401 |

FIG.14B

| CERTIFICATE ACQUISITION REQUEST/SETTING SCREEN | |
|---|---|
| CERTIFICATE LIST<br><br>CONNECTION SETTINGS<br><br>CA CERTIFICATE ACQUISITION<br><br>CERTIFICATE ISSUANCE REQUEST | 1402<br>DEVICE WILL BE RESTARTED TO REFLECT SETTINGS. |

FIG.15

| CERTIFICATE ACQUISITION REQUEST/SETTING SCREEN |||||||
|---|---|---|---|---|---|---|
| CERTIFICATE LIST | CERTIFICATE LIST ||||||
| | NAME | PURPOSE | ISSUER | END DATE OF PERIOD OF VALIDITY | DETAILS | |
| CONNECTION SETTINGS | Xyz1 | — | CA001 | 2020/1/1 | ☼ | |
| CA CERTIFICATE ACQUISITION | Xyz2 | IPSEC | CA001 | 2036/1/1 | ☼ | |
| | Xyz3 | IEEE802.1X | CA001 | 2025/1/1 | ☼ | |
| CERTIFICATE ISSUANCE REQUEST | Xyz4 | TLS | CA001 | 2021/1/1 | ☼ | ~1501 |

FIG.16

| CERTIFICATE ACQUISITION REQUEST/SETTING SCREEN ||
|---|---|
| CERTIFICATE LIST<br><br>CONNECTION SETTINGS<br><br>CA CERTIFICATE ACQUISITION<br><br>CERTIFICATE ISSUANCE REQUEST | DETAILS OF CERTIFICATE INFORMATION<br><br>NAME: Xyz1<br><br>PURPOSE: TLS<br><br>ISSUER: CN=CA01, C=JP<br><br>START OF PERIOD OF VALIDITY: 2017/1/1<br>END OF PERIOD OF VALIDITY: 2020/1/1<br><br>ISSUANCE DESTINATION: CN=Device001, OU=Dev.A, O=ABC, C=JP<br><br>ALGORITHM OF KEY: RSA 2048bit<br><br>SERIAL NUMBER: 01 02 03 04 05<br><br>THUMBPRINT OF CERTIFICATE (SHA-1):<br>01 02 01 03 01 04 01 05 01 06 01 07 01 08 01 09 01 0A 01 0B |

FIG. 17A

| NAME | PURPOSE | ISSUER | START DATE OF PERIOD OF VALIDITY | END DATE OF PERIOD OF VALIDITY | ISSUANCE DESTINATION | ALGORITHM | KEY LENGTH | SERIAL NUMBER | THUMBPRINT |
|---|---|---|---|---|---|---|---|---|---|
| Xyz1 | TLS | CN=CA01, C=JP | 2019/1/1 | 2020/1/1 | CN=Device01,OU= Dev.A, O=ABC, C=JP | RSA | 1024 | 01 02 03 04 05 | 01 02 01 03 01 04 01 05 01 06 01 07 01 08 01 09 01 0A 01 0B |
| Xyz2 | IPSEC | CN=CA01, C=JP | 2015/1/1 | 2036/1/1 | CN=Device01,OU= Dev.A, O=ABC, C=JP | RSA | 2048 | 01 02 03 04 06 | 02 02 02 03 02 04 02 05 02 06 02 07 02 08 02 09 02 0A 02 0B |
| Xyz3 | IEEE802.1X | CN=CA01, C=JP | 2020/1/1 | 2025/1/1 | CN=Device01,OU= Dev.A, O=ABC, C=JP | RSA | 2048 | 01 02 03 04 07 | 03 02 03 03 03 04 03 05 03 06 03 07 03 08 03 09 03 0A 03 0B |

FIG. 17B

| NAME | PURPOSE | ISSUER | START DATE OF PERIOD OF VALIDITY | END DATE OF PERIOD OF VALIDITY | ISSUANCE DESTINATION | ALGORITHM | KEY LENGTH | SERIAL NUMBER | THUMBPRINT |
|---|---|---|---|---|---|---|---|---|---|
| Xyz1 | TLS | CN=CA01, C=JP | 2019/1/1 | 2020/1/1 | CN=Device01,OU= Dev.A, O=ABC, C=JP | RSA | 1024 | 01 02 03 04 05 | 01 02 01 03 01 04 01 05 01 06 01 07 01 08 01 09 01 0A 01 0B |
| Xyz2 | IPSEC | CN=CA01, C=JP | 2015/1/1 | 2036/1/1 | CN=Device01,OU= Dev.A, O=ABC, C=JP | RSA | 2048 | 01 02 03 04 06 | 02 02 02 03 02 04 02 05 02 06 02 07 02 08 02 09 02 0A 02 0B |
| Xyz3 | IEEE802.1X | CN=CA01, C=JP | 2020/1/1 | 2025/1/1 | CN=Device01,OU= Dev.A, O=ABC, C=JP | RSA | 2048 | 01 02 03 04 07 | 03 02 03 03 03 04 03 05 03 06 03 07 03 08 03 09 03 0A 03 0B |
| Xyz4 | ABSENT | CN=CA01, C=JP | 2020/1/1 | 2025/1/1 | CN=Device01,OU= Dev.A, O=ABC, C=JP | RSA | 2048 | 01 02 03 04 08 | 04 02 04 03 04 04 04 05 04 06 04 07 04 08 04 09 04 0A 04 0B |

FIG. 17C

| NAME | PURPOSE | ISSUER | START DATE OF PERIOD OF VALIDITY | END DATE OF PERIOD OF VALIDITY | ISSUANCE DESTINATION | ALGORITHM | KEY LENGTH | SERIAL NUMBER | THUMBPRINT |
|---|---|---|---|---|---|---|---|---|---|
| Xyz1 | ABSENT | CN=CA01, C=JP | 2019/1/1 | 2020/1/1 | CN=Device001,OU= Dev.A, O=ABC, C=JP | RSA | 1024 | 01 02 03 04 05 | 01 02 01 03 01 04 01 05 01 06 01 07 01 08 01 09 01 0A 01 0B |
| Xyz2 | IPSEC | CN=CA01, C=JP | 2015/1/1 | 2035/1/1 | CN=Device001,OU= Dev.A, O=ABC, C=JP | RSA | 2048 | 01 02 03 04 06 | 02 02 02 03 02 04 02 05 02 06 02 07 02 08 02 09 02 0A 02 0B |
| Xyz3 | IEEE802.1X | CN=CA01, C=JP | 2020/1/1 | 2025/1/1 | CN=Device001,OU= Dev.A, O=ABC, C=JP | RSA | 2048 | 01 02 03 04 07 | 03 02 03 03 03 04 03 05 03 06 03 07 03 08 03 09 03 0A 03 0B |
| Xyz4 | TLS | CN=CA01, C=JP | 2020/1/1 | 2025/1/1 | CN=Device001,OU= Dev.A, O=ABC, C=JP | RSA | 2048 | 01 02 03 04 08 | 04 02 04 03 04 04 04 05 04 06 04 07 04 08 04 09 04 0A 04 0B |

FIG.18

CERTIFICATE ACQUISITION REQUEST/SETTING SCREEN

- CERTIFICATE LIST
- CONNECTION SETTINGS
- CA CERTIFICATE ACQUISITION
- CERTIFICATE ISSUANCE REQUEST
- RESERVATION SETTINGS

CERTIFICATE UPDATE RESERVATION SETTINGS — 1801

○ SPECIFY UPDATE DATE
ACQUISITION REQUEST START DATE [ ] YEAR [ ] MONTH [ ] DAY
ACQUISITION REQUEST START TIME [ ] HOUR [ ] MINUTES

— 1802

⦿ UPDATE IF PERIOD OF VALIDITY OF CERTIFICATE IS PREDETERMINED PERIOD OR LESS
[ 14 ] DAYS BEFORE EXPIRATION DATE

— 1803

○ UPDATE IN DETERMINED PERIOD
  ○ UPDATE EVERY [ ] DAYS
  ○ UPDATE ON [ ] -TH EVERY MONTH
  ○ UPDATE ON [ ] [ ] -TH EVERY YEAR

— 1804

CERTIFICATE AUTOMATIC DELETION SETTINGS

AUTOMATIC DELETION AFTER UPDATE: ⦿ YES (18041)   ○ NO (18042)

☑ DELETE IF NUMBER OF STORED ELECTRIC CERTIFICATES REACHES PREDETERMINED NUMBER — 18043

AUTOMATIC DELETION DETAILED SETTINGS — 1805

☑ DELETE OLDER CERTIFICATE WITH SAME PURPOSE SETTING — 18051
☐ DELETE CERTIFICATE WITH NO PURPOSE SETTING — 18052
☐ DELETE ONLY SELF-CERTIFICATE — 18053
☐ DELETE CERTIFICATE SET UPON SHIPMENT FROM FACTORY — 18054
☐ DELETE EXPIRED CERTIFICATE — 18055

INFORMATION PROCESSING APPARATUS, CONTROL METHOD FOR CONTROLLING INFORMATION PROCESSING APPARATUS, AND STORAGE MEDIUM

BACKGROUND

Field

The present disclosure relates to a technique for automatically deleting an electronic certificate.

Description of the Related Art

Conventionally, public key infrastructure (PKI) technology using an electronic certificate realizes identification and certification of a secure network (RFC 3647: Internet X.509 Public Key Infrastructure Certificate Policy and Certification Practices Framework (https://www.ipa.go.jp/security/rfc/RFC3647JA.html)).

For example, an information processing apparatus as a client can verify the validity of a server by acquiring a server's public key certificate from the server and a certificate authority certificate from a certificate authority having issued the server's public key certificate. Further, by providing the server with a client's public key certificate of the information processing apparatus, the server can also verify the validity of the client.

An electronic certificate has an expiration date. If the electronic certificate expires, communication using the electronic certificate becomes impossible. Thus, in a case where the electronic certificate expires, or immediately before the electronic certificate expires, it is necessary to update the electronic certificate.

Conventionally, a technique for automatically updating an electronic certificate at a predetermined timing before the electronic certificate expires is known (Japanese Patent Application Laid-Open No. 2016-178458). When a predetermined timing set in advance arrives, an information processing apparatus transmits an update request to a certificate management server via a network and receives an electronic certificate from the certificate management server.

In a case where the number of electronic certificates that can be stored in the information processing apparatus is limited, if an electronic certificate is acquired every time an electronic certificate is updated, the number of electronic certificates that can be stored reaches an upper limit, and an electronic certificate cannot be added.

Meanwhile, it is troublesome for a user to manually delete an electronic certificate that has become unnecessary due to expiration or the like.

SUMMARY

An information processing apparatus described in the following exemplary embodiments has the following configuration.

According to various embodiments of the present disclosure, an information processing apparatus includes a memory device that stores a set of instructions, and at least one processor that executes the set of instructions to generate an electronic certificate signing request based on a key pair, transmit an electronic certificate issuance request including the electronic certificate signing request to an external apparatus, receive a response transmitted from the external apparatus in response to the issuance request, where the response includes an electronic certificate, acquire a result of the certificate issuance request and the electronic certificate included in the received response, store the acquired electronic certificate in a storage unit, make a setting for determining an electronic certificate that should be deleted from among one or more electronic certificates stored in the storage unit, and delete the electronic certificate that should be deleted according to the made setting, in a case where another electronic certificate is to be acquired from the external apparatus.

Further features will become apparent from the following description of exemplary embodiments with reference to the attached drawings.

BRIEF DESCRIPTION OF THE DRAWINGS

FIG. 6 is a flowchart illustrating a process of making connection settings for connection to a certificate/registration authority in step S407 in FIG. 4, which is performed by the multifunction peripheral according to the first exemplary embodiment.

FIG. 9 is a flowchart illustrating a process regarding the restart of the multifunction peripheral in steps S424 to S427 in FIG. 4, which is performed by the multifunction peripheral according to the first exemplary embodiment.

FIG. 10A is a diagram illustrating an example of a web page screen (a certificate list) as a remote user interface (RUI) displayed on the PC according to the first exemplary embodiment, and FIG. 10B is a diagram illustrating an example of a web page screen (connection settings) as an RUI displayed on the PC according to the first exemplary embodiment.

FIG. 11A is a diagram illustrating an example of a web page screen (the connection settings) as an RUI displayed on the PC according to the first exemplary embodiment, and FIG. 11B is a diagram illustrating an example of a web page screen (CA certificate acquisition) as an RUI displayed on the PC according to the first exemplary embodiment.

FIG. 12A is a diagram illustrating an example of a web page screen (success of the CA certificate acquisition) as an RUI displayed on the PC according to the first exemplary embodiment, and FIG. 12B is a diagram illustrating an example of a web page screen (failure of the CA certificate acquisition) as an RUI displayed on the PC according to the first exemplary embodiment.

FIG. 13A is a diagram illustrating an example of a web page screen (certificate issuance request settings) as an RUI displayed on the PC according to the first exemplary embodiment, and FIG. 13B is a diagram illustrating an example of a web page screen (success of a certificate issuance request) as an RUI displayed on the PC according to the first exemplary embodiment.

FIG. 14A is a diagram illustrating an example of a web page screen (failure of the certificate issuance request) as an RUI displayed on the PC according to the first exemplary embodiment, and FIG. 14B is a diagram illustrating an example of a web page screen (a restart) as an RUI displayed on the PC according to the first exemplary embodiment.

FIG. 15 is a diagram illustrating an example of a web page screen as an RUI displayed on the PC according to the first exemplary embodiment.

FIG. 16 is a diagram illustrating an example of detailed information of an electronic certificate displayed on the PC according to the first exemplary embodiment.

FIGS. 17A, 17B, and 17C are conceptual diagrams illustrating a database of detailed information of key pairs and electronic certificates managed by a key pair/certificate management unit of the multifunction peripheral according to the first exemplary embodiment.

FIG. 18 is a diagram illustrating an example of an update reservation setting screen for electronic certificates included in the multifunction peripheral according to the first exemplary embodiment.

DESCRIPTION OF THE EMBODIMENTS

With reference to the attached drawings, exemplary embodiments will be described in detail below. The following exemplary embodiments do not limit the present disclosure according to the appended claims, and not all the combinations of the features described in the exemplary embodiments are essential for solving the problems addressed by the present disclosure. An information processing apparatus for using and managing an electronic certificate according to an exemplary embodiment is described using a multifunction peripheral (a digital multifunction peripheral (MFP)) as an example. The scope of application of the information processing apparatus, however, is not limited to a multifunction peripheral, and the information processing apparatus may be any information processing apparatus that uses an electronic certificate.

Figure 1:
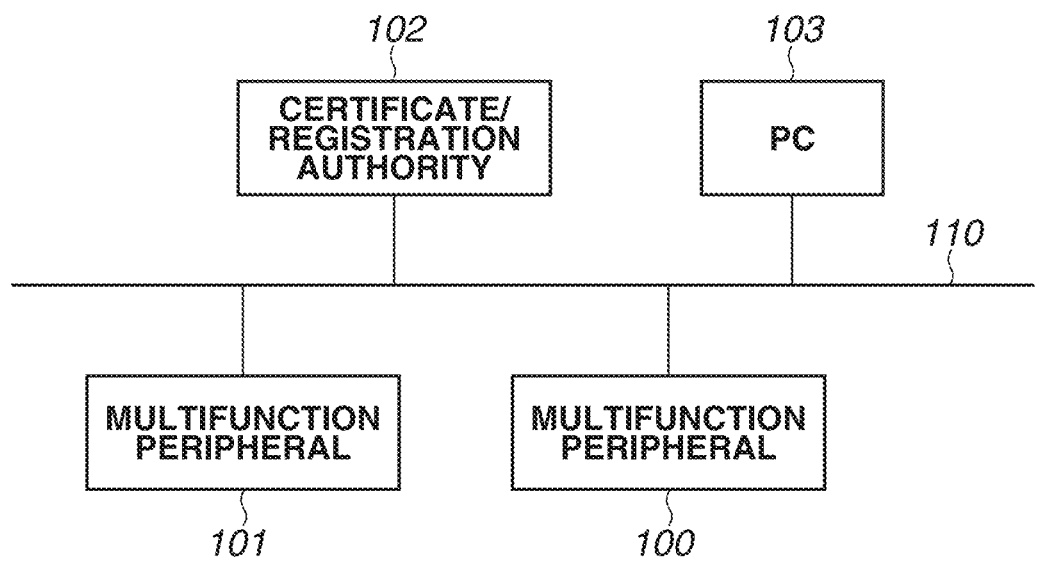
FIG. 1 is a diagram illustrating a network configuration according to a first exemplary embodiment.

FIG. 1 is a diagram illustrating a network configuration according to a first exemplary embodiment.

A multifunction peripheral 100, which has a printing function, can transmit and receive print data, scanned image data, and management information of a device to and from another information processing apparatus via a network 110. Further, the multifunction peripheral 100 has the function of performing encrypted communication using Transport Layer Security (TLS), Internet Protocol Security (IPsec), and Institute of Electrical and Electronics Engineers (IEEE) 802.1X and holds public key pairs and electronic certificates for use in cryptographic processes using these protocols. A public key pair means a key pair including a public key and a private key and used to encrypt communication data by a public key cryptographic method.

The multifunction peripheral 100 is an example of an image forming apparatus. The image forming apparatus is not limited to this, and may be an apparatus having a single function of a facsimile apparatus, a printer, or a copying machine, or having multiple functions of these apparatuses. The network 110 is also connected to a multifunction peripheral 101, which has a function equivalent to that of the multifunction peripheral 100. Although the multifunction peripheral 100 is mainly described below, an electronic certificate can also be exchanged between a plurality of multifunction peripherals.

A certificate/registration authority 102 has the function of a certificate authority (CA) for issuing an electronic certificate, and the function of a registration authority (RA) for performing the process of receiving an electronic certificate issuance request and registering an electronic certificate. That is, the certificate/registration authority 102 is a server apparatus having the function of distributing a CA certificate via the network 110, and issuing and registering an electronic certificate via the network 110. In the first exemplary embodiment, as a communication protocol on the network 110 at this time, Simple Certificate Enrollment Protocol (SCEP) is used. The communication protocol, however, need only to be able to request the certificate authority to issue an electronic certificate and acquire the electronic certificate from the certificate authority, and thus is not limited to SCEP. For example, the Certificate Management Protocol (CMP) or the Enrollment over Secure Transport (EST) protocol may also be used.

Using SCEP, the information processing apparatus such as the multifunction peripheral 100 communicates with the certificate/registration authority 102 via the network 110 to make an electronic certificate issuance request and acquire an electronic certificate. The multifunction peripheral 100 according to the first exemplary embodiment has a web server function and publishes on the network 110 a web page type remote user interface (RUI) function capable of executing the process of making an electronic certificate issuance request and acquiring an electronic certificate. The RUI function is the function of allowing an information terminal such as a personal computer (PC) to access a web server included in the multifunction peripheral 100 and displaying, on a display unit of the information terminal, a web page for operating the multifunction peripheral 100.

When the certificate/registration authority 102 receives an electronic certificate issuance request via the network 110, the certificate/registration authority 102 performs the process of, based on the issuance request, issuing an electronic certificate and registering the electronic certificate and transmits the issued electronic certificate as a response to the issuance request. In the first exemplary embodiment, the functions of the certificate authority and the registration authority are achieved by the same server apparatus. Alternatively, the configuration may be such that the certificate authority and the registration authority are achieved by different server apparatuses. The present disclosure is not particularly limited.

A PC 103 is a personal computer. The PC 103 has a web browser function and allows the browsing and the use of a HyperText Markup Language (HTML) document and a website published by an information processing apparatus connected to the network 110.

Next, a description is given of an overview of the process of acquiring and updating an electronic certificate according to the first exemplary embodiment.

Using the web browser provided in the PC 103, the administrator of the multifunction peripheral 100 connects to a web page to make an electronic certificate issuance request to issue an electronic certificate published by the multifunction peripheral 100, and acquire the electronic certificate. Then, the administrator makes settings and gives instructions for the execution of the process of making an electronic certificate issuance request and acquiring an electronic certificate. According to the contents of the settings made and the instructions given by the administrator, then using SCEP, the multifunction peripheral 100 acquires a CA certificate from the certificate/registration authority 102 and makes an electronic certificate issuance request to the certificate/registration authority 102. Further, the multifunction peripheral 100 acquires an electronic certificate included in a response to the electronic certificate issuance request and issued by the certificate/registration authority 102, and sets the use of the acquired electronic certificate in the multifunction peripheral 100.

Next, the hardware configuration of the multifunction peripheral 100 according to the first exemplary embodiment is described.

Figure 2:
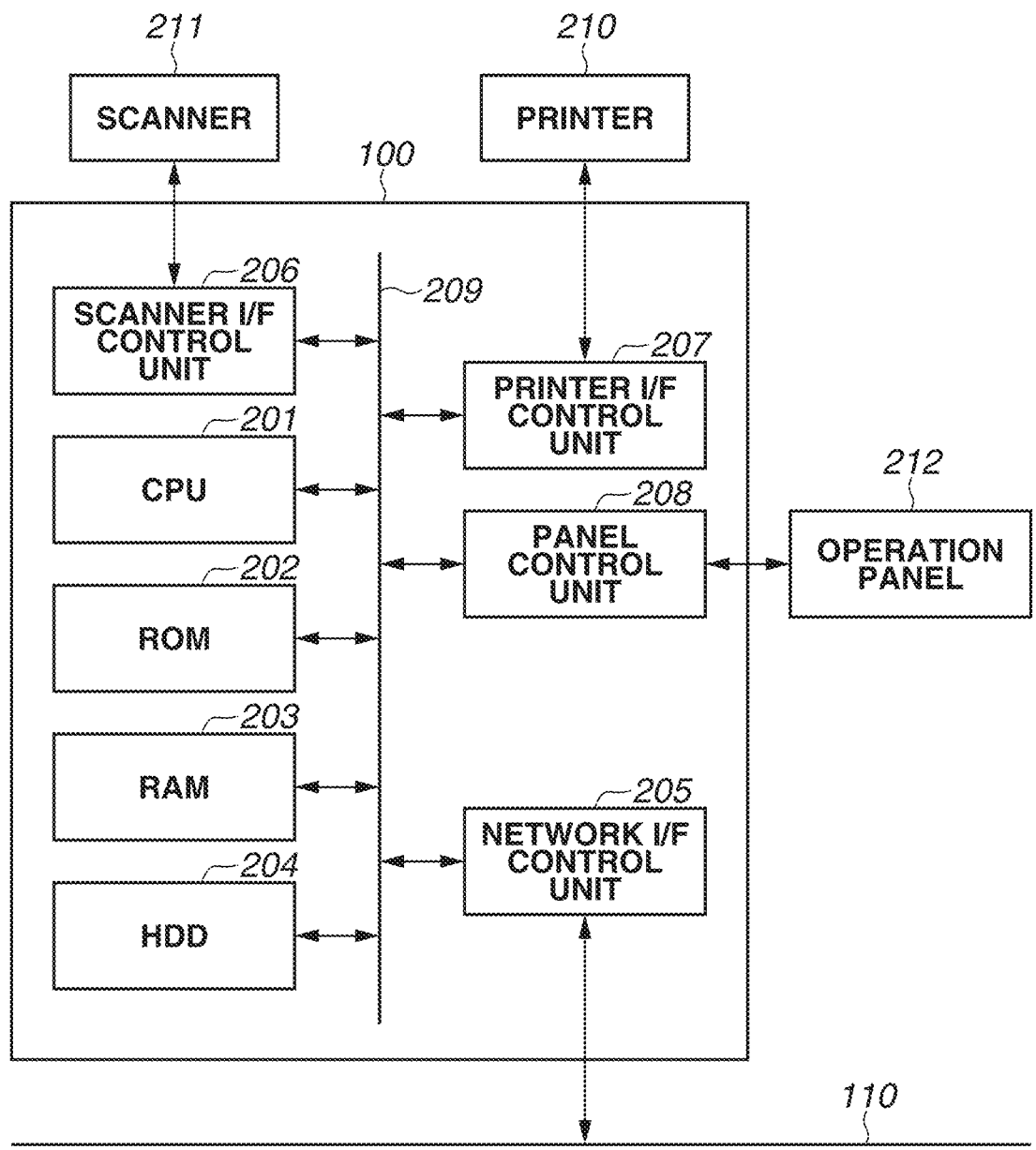
FIG. 2 is a block diagram illustrating a hardware configuration of a multifunction peripheral according to the first exemplary embodiment.

FIG. 2 is a block diagram illustrating the hardware configuration of the multifunction peripheral 100 according to the first exemplary embodiment.

A central processing unit (CPU) 201 executes a software program for the multifunction peripheral 100 and controls the entire apparatus. A read-only memory (ROM) 202 stores a boot program and a fixed parameter for the multifunction peripheral 100. A random-access memory (RAM) 203 is used to store a program and temporary data when the CPU 201 controls the multifunction peripheral 100. A hard disk drive (HDD) 204 stores system software, an application, and various types of data. The CPU 201 executes the boot program stored in the ROM 202, loads a program stored in the HDD 204 into the RAM 203, and executes the loaded program, thereby controlling the operation of the multifunction peripheral 100. A network interface (I/F) control unit 205 controls the transmission and reception of data to and from the network 110. A scanner I/F control unit 206 controls the reading of a document by a scanner 211. A printer I/F control unit 207 controls a printing process performed by a printer 210. A panel control unit 208 controls a touch panel type operation panel 212, thereby controlling the display of various pieces of information and an instruction input by a user. A bus 209 connects the CPU 201, the ROM 202, the RAM 203, the HDD 204, the network I/F control unit 205, the scanner I/F control unit 206, the printer I/F control unit 207, and the panel control unit 208 to each other. A control signal from the CPU 201 and a data signal between devices are transmitted and received via the bus 209.

Figure 3:
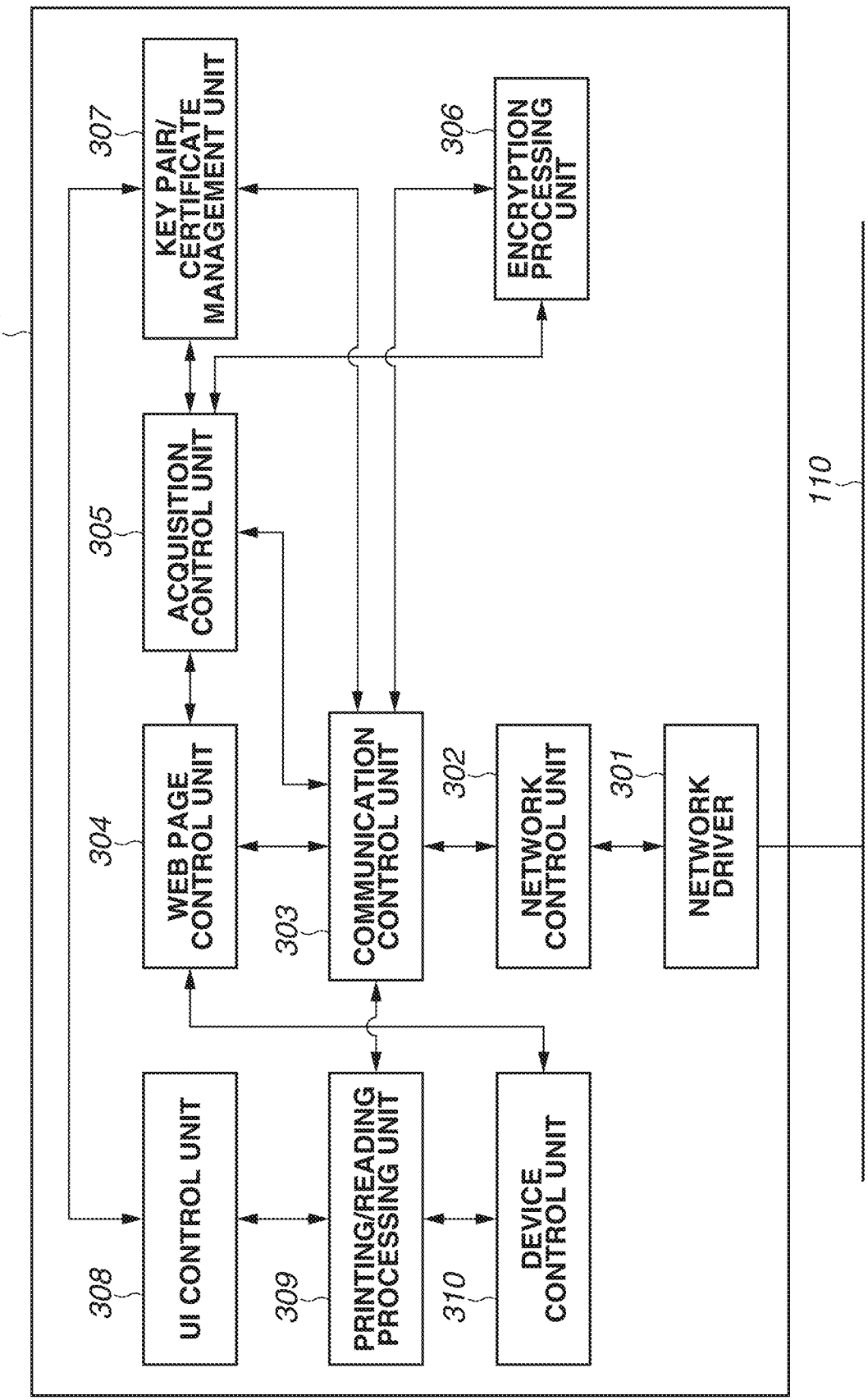
FIG. 3 is a block diagram illustrating software modules included in the multifunction peripheral according to the first exemplary embodiment.

FIG. 3 is a block diagram illustrating software modules of the multifunction peripheral 100 according to the first exemplary embodiment. The software modules illustrated in FIG. 3 are achieved by the CPU 201 executing a program loaded into the RAM 203.

A network driver 301 controls the network I/F control unit 205 connected to the network 110 to transmit and receive data to and from outside the multifunction peripheral 100 via the network 110. A network control unit 302 controls communication on the transport layer or below in a network communication protocol such as the Transmission Control Protocol/Internet Protocol (TCP/IP) to transmit and receive data. A communication control unit 303 is a module for controlling a plurality of communication protocols supported by the multifunction peripheral 100. In the process of acquiring and updating an electronic certificate according to the first exemplary embodiment, the communication control unit 303 makes a request for Hypertext Transfer Protocol (HTTP) protocol communication, performs the process of generating response data and analyzing the response data, and controls the transmission and reception of data, thereby communicating with the certificate/registration authority 102 or the PC 103. Further, the communication control unit 303 also executes encrypted communication using TLS, IPSEC, and IEEE 802.1X supported by the multifunction peripheral 100.

A web page control unit 304 is a module for generating HTML data for displaying a web page on which the process of making an electronic certificate issuance request and acquiring an electronic certificate can be executed, and for controlling communication of the HTML data. The web page control unit 304 executes processes in response to a web page display request, an electronic certificate issuance request, and an electronic certificate acquisition execution instruction that are sent from the network driver 301 via the communication control unit 303. The web page control unit 304 transmits, as a response to a request from the web browser, HTML data of a predetermined web page saved in the RAM 203 or the HDD 204, or HTML data generated according to the content of a display request.

An acquisition control unit 305 is a module for executing the process of acquiring an electronic certificate based on an instruction from the web page control unit 304. The acquisition control unit 305 is a module for controlling communication using SCEP, for performing the process of generating encrypted data necessary for communication using SCEP such as PKCS #7 or PKCS #10 and analyzing the encrypted data, and for performing the process of saving an acquired electronic certificate and setting the purpose of the acquired electronic certificate.

An encryption processing unit 306 is a module for executing various cryptographic processes such as the process of encrypting and decrypting data, the process of generating and verifying an electronic signature, and the process of generating a hash value. In the process of acquiring and updating an electronic certificate according to the first exemplary embodiment, the encryption processing unit 306 executes various cryptographic processes necessary in the process of generating request data and response data using SCEP and analyzing the request data and the response data.

A key pair/certificate management unit 307 is a module for managing a public key pair and an electronic certificate held in the multifunction peripheral 100. The key pair/certificate management unit 307 saves data of a public key pair and an electronic certificate together with various setting values in the RAM 203 or the HDD 204. Further, although not illustrated in the figures in the first exemplary embodiment, the process of displaying the details of a public key pair and an electronic certificate, the process of generating a public key pair and an electronic certificate, and the process of deleting a public key pair and an electronic certificate can also be executed by an instruction from the user through the operation panel 212.

A user interface (UI) control unit 308 controls the operation panel 212 and the panel control unit 208. Also in an encrypted communication process using TLS, IPSEC, or IEEE 802.1X executed by the communication control unit 303, the encryption processing unit 306 performs an encryption process. The configuration is such that in the encryption process, the encryption processing unit 306 acquires data of a public key pair and an electronic certificate to be used from the key pair/certificate management unit 307.

A printing/reading processing unit 309 is a module for executing the function of printing by the printer 210 and the function of reading a document by the scanner 211. A device control unit 310 is a module for generating a control command and control data for the multifunction peripheral 100 and performing overall control of the multifunction peripheral 100. The device control unit 310 according to the first exemplary embodiment controls power supply to the multifunction peripheral 100, and according to an instruction from the web page control unit 304, executes the process of restarting the multifunction peripheral 100.

Figure 4:
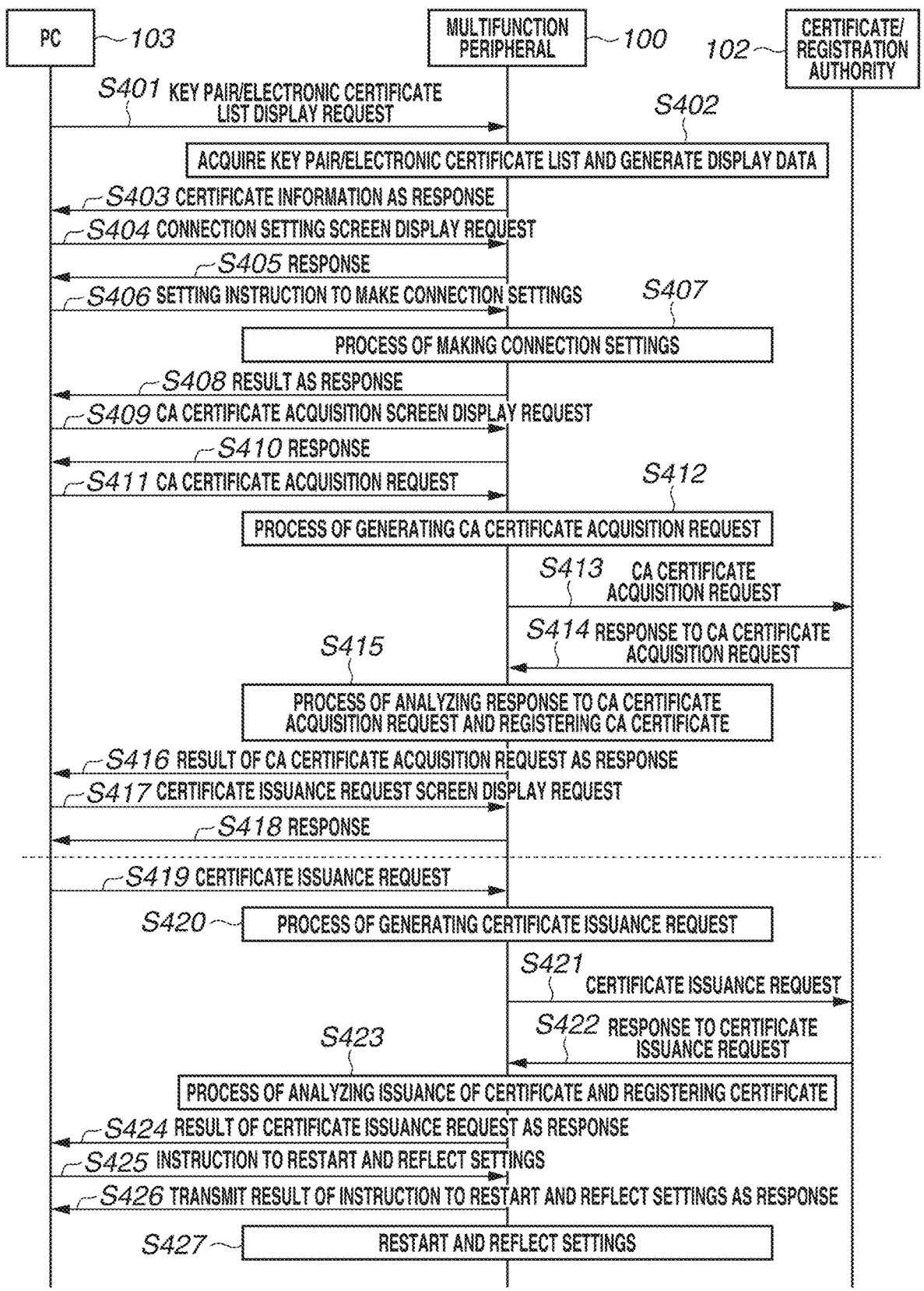
FIG. 4 is a sequence diagram illustrating a flow of processing performed by a system according to the first exemplary embodiment, including initialization regarding an electronic certificate issuance request, display of information of an electronic certificate, making of an issuance request to issue the electronic certificate, reception of the electronic certificate, a restart of the multifunction peripheral, and reflection of the received electronic certificate.

FIG. 4 is a sequence diagram illustrating the flow of entire processing performed by a system according to the first exemplary embodiment, including initialization regarding an electronic certificate issuance request, the display of information of an electronic certificate, the making of an issuance request to issue the electronic certificate, the reception of the electronic certificate, the restart of the multifunction peripheral 100, and the reflection of the received electronic certificate.

This sequence is started in response to the fact that the user inputs to the PC 103 a display instruction to display an electronic certificate list. According to the display instruction, the PC 103 may display key pairs together with the certificate list. A description is given below of an example where the PC 103 displays a list of key pairs and electronic certificates according to the display instruction.

In the first exemplary embodiment, the description is given using an example of processing on a single multifunction peripheral 100. Alternatively, processing may be executed on a plurality of multifunction peripherals 100 and 101 in response to a single start instruction. For example, the PC 103 may make requests to the multifunction peripherals 100 and 101, and each multifunction peripheral may execute processing illustrated in flowcharts described below. A step in which the PC 103 acquires a certificate list from each of the multifunction peripherals 100 and 101, displays the certificate list, and prompts the user to confirm the certificate list may be skipped. Then, each multifunction peripheral may automatically detect an expired certificate and transmit bibliographic information (the certificate identification (ID) and the period of validity) of the expired certificate to the PC 103. Then, the PC 103 may cause the plurality of multifunction peripherals to automatically update a certificate which is about to expire or an expired certificate. This processing is termed "silent installation".

First, in step S401, the multifunction peripheral 100 receives a display request transmitted from the PC 103. The display request is a display request to display a list of electronic certificates held in the multifunction peripheral 100. In the first exemplary embodiment, using the web browser provided in the PC 103, the administrator of the multifunction peripheral 100 connects to a web page published by the multifunction peripheral 100 for making an electronic certificate issuance request and acquiring an electronic certificate, and performs operations such as giving instructions. In the present exemplary embodiment, an operation screen on the web page thus displayed on a display unit of the PC 103 is occasionally referred to as an "RUI". The RUI is a user interface displayed on the PC 103 by remotely requesting operation screen data of the multifunction peripheral 100 or 101 using the web browser of the PC 103. At this time, the screen can be implemented by HTML or a servlet.

Next, in step S402, the multifunction peripheral 100 executes the process of acquiring data for displaying a list of key pairs and electronic certificates held in the multifunction peripheral 100, and of generating a web page screen for displaying the list.

Figure 5A:
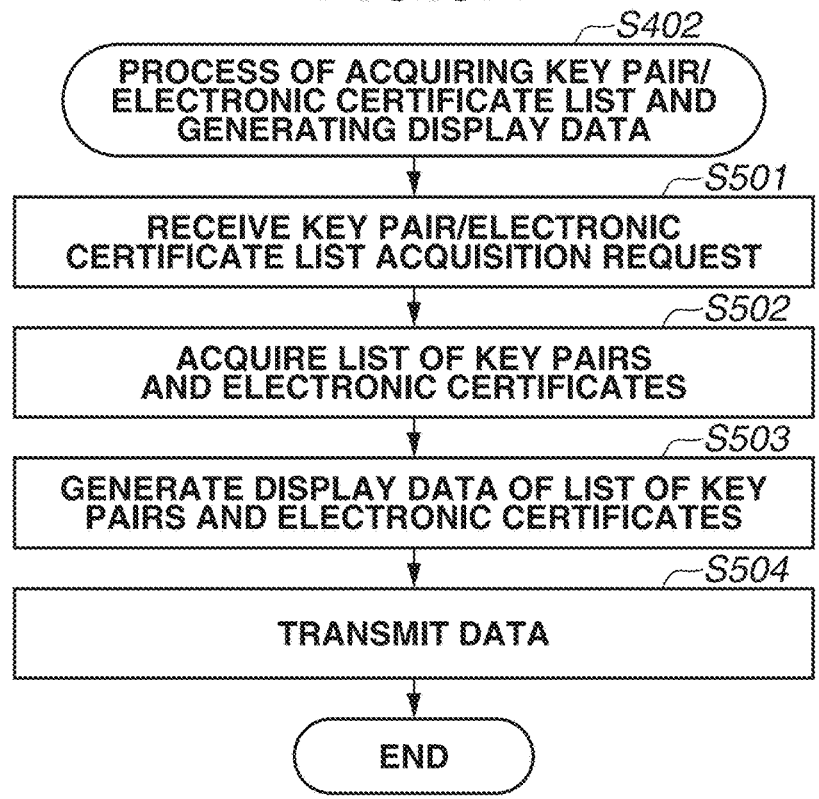
FIG. 5A is a flowchart illustrating a process of acquiring a list of key pairs and electronic certificates and generating display data in step S402 in FIG. 4, which is performed by the multifunction peripheral according to the first exemplary embodiment.

FIG. 5A is a flowchart illustrating the process of acquiring a list of key pairs and electronic certificates and generating display data in step S402 in FIG. 4. This processing is achieved by the CPU 201 executing a program loaded into the RAM 203.

Further, FIGS. 17A to 17C are conceptual diagrams illustrating a database of detailed information of key pairs and electronic certificates managed by the key pair/certificate management unit 307 of the multifunction peripheral 100. This database is saved in the HDD 204 of the multifunction peripheral 100.

The flowchart in FIG. 5A is described. This processing is started by receiving a key pair/electronic certificate list acquisition request. First, in step S501, the CPU 201 receives a key pair/electronic certificate list acquisition request. Next, in step S502, the CPU 201 acquires detailed information of key pairs and electronic certificates managed by the key pair/certificate management unit 307 as illustrated in FIG. 17A, for example. Next, in step S503, using the detailed information of the key pairs and the electronic certificates acquired in step S502, the CPU 201 generates HTML data of a web page screen to be provided as an RUI.

FIGS. 10A to 15 are diagrams illustrating examples of a web page screen as an RUI displayed on the PC 103 according to the first exemplary embodiment. In step S503 in FIG. 5A according to the first exemplary embodiment, HTML data of a web page screen illustrated in FIG. 10A is generated, and the web page screen is displayed on the web browser of the PC 103. Consequently, it is possible to confirm on the PC 103 a list of key pairs and electronic certificates held in the multifunction peripheral 100.

Information of the electronic certificates displayed in the list in FIG. 10A includes a name 1011, a purpose 1012, an issuer 1013, an end date of a period of validity 1014, and details 1015 of each certificate. The name 1011 is a character string optionally assigned by an operator such as the administrator of the multifunction peripheral 100 when the key pair and the electronic certificate are issued. The purpose 1012 is a setting value indicating that the key pair and the electronic certificate are used for any of purposes such as TLS, IPSEC, and IEEE 802.1X. The issuer 1013 is a distinguished name (DN) of a certificate authority that has issued the electronic certificate. The end date of the period of validity 1014 is information about the day when the period of validity of the electronic certificate ends. The details 1015 is an icon for displaying the detailed information of the electronic certificate. Then, in step S504, the CPU 201 transmits to the PC 103 the HTML data generated in step S503 as a response to step S501, and this processing ends. Step S402 in FIG. 4 is thus executed.

Although not illustrated in the sequence diagram in FIG. 4, if the administrator of the multifunction peripheral 100 clicks an icon of the details 1015 in FIG. 10A displayed on the PC 103, the PC 103 transmits to the multifunction peripheral 100 a display request to display detailed information of an electronic certificate corresponding to the icon. Receiving the display request, the multifunction peripheral 100 acquires the detailed information of the electronic certificate, generates HTML data of the detailed information of the certificate based on the acquired information, and transmits to the PC 103 the generated data as a response.

Consequently, for example, detailed information of an electronic certificate as illustrated in FIG. 16 is displayed on the web browser of the PC 103. FIG. 16 is a diagram illustrating an example of the detailed information of the electronic certificate displayed on the PC 103.

Figure 5B:
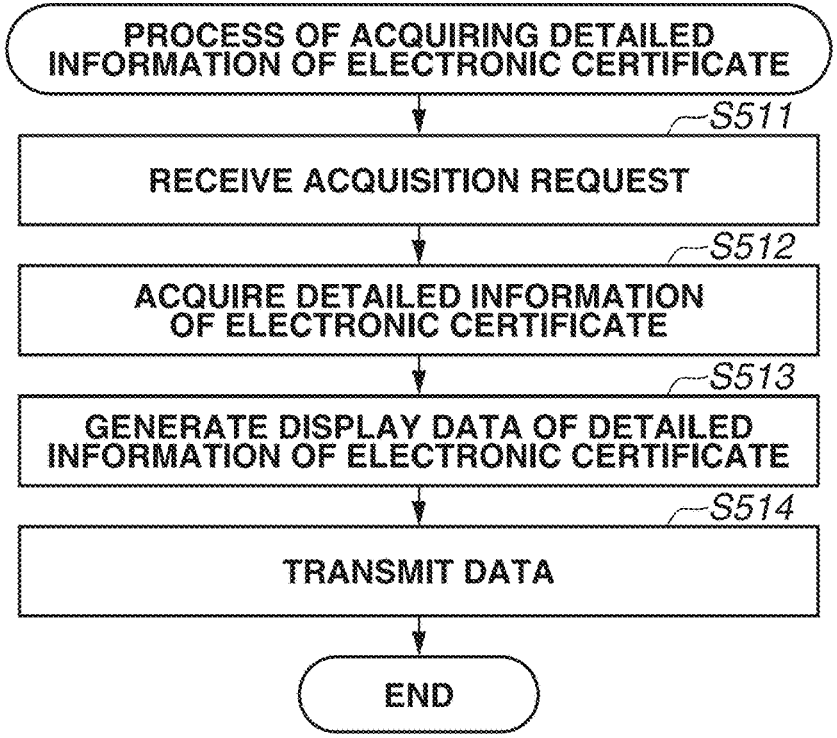
FIG. 5B is a flowchart illustrating a process performed when the multifunction peripheral according to the first exemplary embodiment receives a request to display detailed information from a personal computer (PC).

FIG. 5B is a flowchart illustrating a process performed when the multifunction peripheral 100 according to the first exemplary embodiment receives from the PC 103 this request to display detailed information. This processing is achieved by the CPU 201 executing a program loaded into the RAM 203.

First, in step S511, the CPU 201 receives an electronic certificate detailed information acquisition request from the PC 103. Next, in step S512, the CPU 201 acquires detailed information of a key pair and an electronic certificate managed by the key pair/certificate management unit 307 and illustrated in FIG. 17A. Next, in step S513, using the detailed information of the key pair and the electronic certificate acquired in step S512, the CPU 201 generates HTML data of a web page screen. In step S514, the CPU 201 transmits the generated HTML data to the PC 103.

FIG. 16 is a diagram illustrating an example of a display screen of the detailed information of the electronic certificate according to the first exemplary embodiment. This screen is displayed as an RUI in a web page format on the PC 103.

Referring back to FIG. 4, in step S403, the multifunction peripheral 100 transmits to the PC 103 the HTML data of the web page screen generated in step S402 and illustrated in FIG. 10A as a response.

The processes illustrated in steps S401 to S403 in FIG. 4, steps S501 to S504 in FIG. 5A, and steps S511 to S514 in FIG. 5B are a control process regarding the process of displaying electronic certificate information, which is performed by the multifunction peripheral 100 having received a key pair/electronic certificate list display request.

Then, in step S404, the multifunction peripheral 100 receives from the PC 103 a display request to display an SCEP server connection setting screen. In the first exemplary embodiment, to make connection settings for connection to the certificate/registration authority 102, the administrator of the multifunction peripheral 100 clicks "connection settings" 1002 in FIG. 10A, thereby transmitting to the multifunction peripheral 100 the display request to display a connection setting screen.

Next, in step S405, the multifunction peripheral 100 transmits, to the PC 103, HTML data of a predetermined SCEP server connection setting screen illustrated in FIG. 10B as a response to step S404.

The connection setting screen illustrated in FIG. 10B includes input fields, namely "server name" 1016 and "port number" 1017, to which a host name and a connection destination port number, respectively, of an SCEP server are input, and a "setting" button 1018 for giving an instruction to set input setting values.

Next, in step S406, the multifunction peripheral 100 receives from the PC 103 a setting instruction request to make connection settings. The administrator of the multifunction peripheral 100 according to the first exemplary embodiment provides inputs to the "server name" 1016 and the "port number" 1017 in FIG. 10B through the PC 103 and clicks the "setting" button 1018, thereby transmitting this setting instruction request to the multifunction peripheral 100.

Next, in step S407, the multifunction peripheral 100 executes the process of making connection settings and generating a web page screen indicating the setting results. In step S408, the multifunction peripheral 100 transmits, to the PC 103, HTML data of the web page screen generated in step S407 and illustrated in FIG. 11A as a response.

FIG. 6 is a flowchart illustrating the process of making connection settings for connection to the certificate/registration authority 102 in step S407 in FIG. 4, which is performed by the multifunction peripheral 100 according to the first exemplary embodiment. This processing is achieved by the CPU 201 executing a program loaded into the RAM 203.

First, in step S601, the CPU 201 receives from the PC 103 a setting request to make connection settings. Next, in step S602, the CPU 201 acquires the setting values of a host name and a port number included in the setting request to make the connection settings, and saves the acquired setting values in the RAM 203 or the HDD 204. Next, in step S603, the CPU 201 generates HTML data of a web page screen in FIG. 11A, for example. Then, in step S604, the CPU 201 transmits the HTML data generated in step S603 as a response to step S601, and this processing ends. Thus, the processing proceeds to step S408.

Consequently, as illustrated in FIG. 11A, the PC 103 displays a character string 1101 indicating that the settings are reflected.

The processes illustrated in steps S406 to S408 and S601 to 604 are control regarding the process of making connection settings, which is performed by the multifunction peripheral 100.

Next, in step S409 in FIG. 4, the multifunction peripheral 100 receives a display request to display a CA certificate acquisition screen transmitted from the browser of the PC 103. In the first exemplary embodiment, the administrator of the multifunction peripheral 100 acquires a CA certificate issued by the certificate/registration authority 102. Thus, the administrator clicks "CA certificate acquisition" 1003 in FIG. 10A, thereby transmitting to the multifunction peripheral 100 the display request to display a CA certificate acquisition screen.

Consequently, in step S410, the multifunction peripheral 100 transmits HTML data of a predetermined CA certificate acquisition screen illustrated in FIG. 11B as a response to step S409.

The CA certificate acquisition screen in FIG. 11B includes an "execution" button 1102 for giving an instruction to acquire a CA certificate.

Next, in step S411, the "execution" button 1102 in FIG. 11B is clicked, and the multifunction peripheral 100 receives a CA certificate acquisition request transmitted from the browser of the PC 103. In the first exemplary embodiment, the administrator of the multifunction peripheral 100 clicks the "execution" button 1102 in FIG. 11B, thereby transmitting to the multifunction peripheral 100 the CA certificate acquisition request.

Next, in step S412, the multifunction peripheral 100 executes the process of generating CA certificate acquisition request data. Then, in step S413, based on the information set in step S407, the multifunction peripheral 100 transmits the CA certificate acquisition request data generated in step S412 to the certificate/registration authority 102 as the SCEP server. Then, in step S414, the multifunction peripheral 100 receives a response to the CA certificate acquisition request transmitted from the certificate/registration authority 102. Consequently, in step S415, the multifunction peripheral 100 performs the process of analyzing the received response to the CA certificate acquisition request, acquiring a CA certificate included in the response, and registering the acquired CA certificate as a CA certificate trusted by the multifunction peripheral 100. Then, in step S416, the multifunction peripheral 100 transmits, to the PC 103, HTML data of a web page screen generated in step S415 as illustrated in FIG. 12A or FIG. 12B. FIG. 12A illustrates an example of a screen displayed when the acquisition of the CA certificate is successful, and the acquired CA certificate is registered as a CA certificate. On the other hand, FIG. 12B illustrates an example of a screen displayed when the acquisition of the CA certificate is failed.

Figure 7:
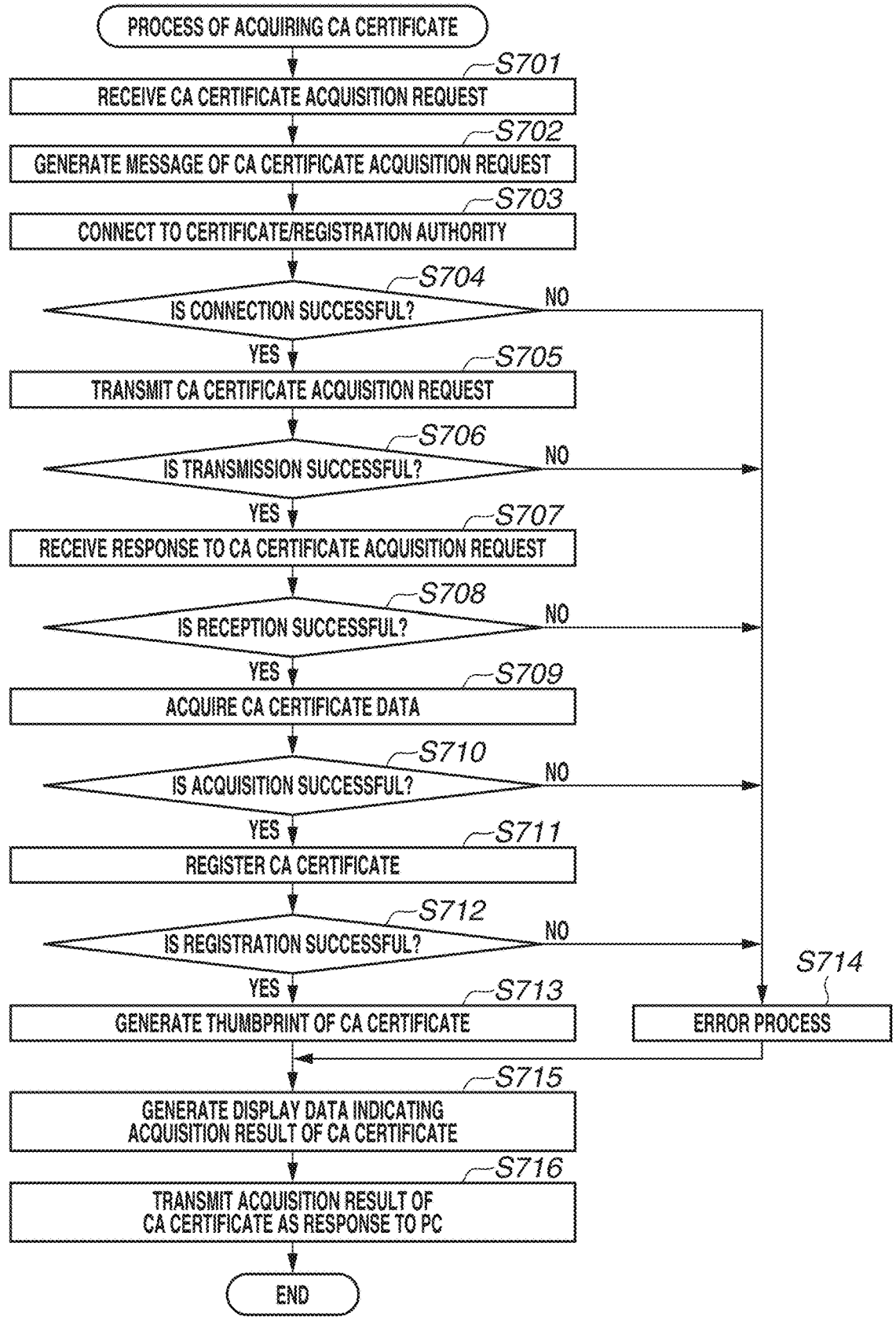
FIG. 7 is a flowchart illustrating a process of acquiring and registering a CA certificate illustrated in steps S412 to S416 in FIG. 4, which is performed by the multifunction peripheral according to the first exemplary embodiment.

FIG. 7 is a flowchart illustrating the process of acquiring and registering a CA certificate illustrated in steps S412 to S416 in FIG. 4, which is performed by the multifunction peripheral 100 according to the first exemplary embodiment. This processing is achieved by the CPU 201 executing a program loaded into the RAM 203.

First, in step S701, the CPU 201 receives a CA certificate acquisition request from the PC 103. Next, in step S702, based on the information of the connection settings for connection to the certificate/registration authority 102 acquired in step S407, the CPU 201 generates a message of the CA certificate acquisition request. The following is an example of the message of the acquisition request generated in the first exemplary embodiment. In the first exemplary embodiment, SCEP is used as a communication protocol, and the message is a request message for using this protocol. xxxxxxx/
yyyyy?operation=GetCAXyz&message=CAIdentifier Next, in step S703, based on the connection settings for connection to the certificate/registration authority 102 acquired in step S407 in FIG. 4, the CPU 201 connects to the certificate/registration authority 102 as the SCEP server using the TCP/IP protocol. Next, in step S704, the CPU 201 determines whether the connection in step S703 is successful. If the connection is successful (YES in step S704), the processing proceeds to step S705. If the connection is failed (NO in step S704), the processing proceeds to step S714.

In step S705, using a GET or POST method of the HTTP protocol, the CPU 201 transmits the message of the CA certificate acquisition request generated in step S702 to the certificate/registration authority 102. Next, in step S706, the CPU 201 determines whether the transmission in step S705 is successful. If the transmission is successful (YES in step S706), the processing proceeds to step S707. If the transmission is failed (NO in step S706), the processing proceeds to step S714. In step S707, the CPU 201 receives, from the certificate/registration authority 102, response data in response to the CA certificate acquisition request. Then, in step S708, the CPU 201 determines whether the reception of the response data in step S707 is successful. If the reception is successful (YES in step S708), the processing proceeds to step S709. If the reception is failed (NO in step S708), the processing proceeds to step S714. In step S709, the CPU 201 analyzes the response data received in step S708 and acquires data of a CA certificate included in the response data. The encryption processing unit 306 performs the process of analyzing the response data and acquiring the CA certificate.

The response data according to the first exemplary embodiment is binary data in X.509 (RFC 5280) format. Alternatively, for example, data in PKCS #7 (RFC 5652: Cryptographic Message Syntax) format may be transmitted as the response, and the data format is not limited.

Next, in step S710, the CPU 201 determines whether the acquisition of the CA certificate in step S709 is successful. If the acquisition is successful (YES in step S710), the processing proceeds to step S711. If the acquisition is failed (NO in step S710), the processing proceeds to step S714. In step S711, the CPU 201 registers the CA certificate acquired in step S709 as a CA certificate trusted by the multifunction peripheral 100. At this time, the CPU 201 holds the acquired CA certificate in the RAM 203 and also causes the key pair/certificate management unit 307 to save the acquired CA certificate in a predetermined directory of the HDD 204 for storing a CA certificate trusted by the multifunction peripheral 100. Then, in step S712, the CPU 201 determines whether the process of registering the CA certificate in step S710 is successful. If it is determined that the registration process is successful (YES in step S712), the processing proceeds to step S713. If the registration process is failed (NO in step S712), the processing proceeds to step S714. In step S713, the CPU 201 generates a thumbprint (a hash value generated using Secure Hash Algorithm 1 (SHA-1)) of the CA certificate to be displayed in a character string 1201 in FIG. 12A when the acquisition of the CA certificate is successful. This thumbprint is generated by the encryption processing unit 306. Then, in step S715, according to the processing results in steps S703 to S714, the CPU 201 generates HTML data of display data indicating the acquisition result of the CA certificate in FIG. 12A. Then, in step S716, the CPU 201 transmits to the PC 103 the HTML data generated in step S715 as a response to step S701, and this processing ends. Then, the processing proceeds to step S417 in FIG. 4. In the first exemplary embodiment, according to the acquisition result of the CA certificate, the CPU 201 displays the character string 1201 in FIG. 12A. If an error process is executed in step S714, the CPU 201 displays a character string 1202 in FIG. 12B. Next, the description returns to FIG. 4.

In step S417, the multifunction peripheral 100 receives a display request to display a certificate issuance request screen transmitted from the browser of the PC 103. In the first exemplary embodiment, the administrator of the multifunction peripheral 100 clicks "certificate issuance request" 1004 in FIG. 10A, to make a certificate issuance request to the certificate/registration authority 102 and to acquire a certificate from the certificate/registration authority 102.

Next, in step S418, the multifunction peripheral 100 transmits, to the PC 103, HTML data of a predetermined certificate issuance request screen illustrated in FIG. 13A as a response to step S417. Consequently, the PC 103 performs display control to display the screen illustrated in FIG. 13A.

The certificate issuance request screen in FIG. 13A includes "name" 1301 of a certificate, "length of key" 1302 for setting the key length of a key pair to be generated, and an "input of issuance destination information" field 1303. Further, the certificate issuance request screen in FIG. 13A includes "signature verification" 1304 for setting whether to verify a signature assigned to a response to a certificate issuance request to be transmitted from the certificate/registration authority 102, and "purpose of key" 1305 for setting the purpose of an issued certificate. Further, the certificate issuance request screen in FIG. 13A includes "password" 1306 to be included in the certificate issuance request, and an "execution" button 1307 for making the certificate issuance request. The "purpose of key" 1305 is check boxes and indicates that a plurality of purposes can be set for a single key.

Next, in step S419, the multifunction peripheral 100 receives a certificate issuance request including information of inputs and settings regarding the items 1301 to 1306 transmitted from the browser of the PC 103 by clicking of the "execution" button 1307 on the screen in FIG. 13A. In the first exemplary embodiment, the administrator of the multifunction peripheral 100 provides inputs and makes settings regarding the items 1301 to 1306 in FIG. 13A and clicks the "execution" button 1307, thereby transmitting the certificate issuance request from the PC 103.

Next, in step S420, the multifunction peripheral 100 executes the process of generating certificate issuance request data. Then, in step S421, based on the information set in step S407, the multifunction peripheral 100 transmits the certificate issuance request data generated in step S420 to the certificate/registration authority 102 as the SCEP server. Then, in step S422, the multifunction peripheral 100 receives a response to the certificate issuance request transmitted from the certificate/registration authority 102. Next, in step S423, the multifunction peripheral 100 performs the process of analyzing the response to the certificate issuance request received in step S422 (the execution of signature verification according to the setting, the acquisition of a certificate included in the response, and the setting of the acquired certificate to a specified purpose). Then, the multifunction peripheral 100 executes the process of generating a web page screen indicating the result of the certificate issuance request.

If the issuance and the acquisition of the certificate are successful, then in the process of step S423, the electronic certificate data is saved, and the purpose of the electronic certificate data is set. The setting of the purpose refers to a communication function using the electronic certificate. In the first exemplary embodiment, encrypted communication using TLS, IPSEC, or IEEE 802.1X can be set. Further, the multifunction peripheral 100 according to the first exemplary embodiment can have a plurality of electronic certificates, and the purpose is set for each electronic certificate. For example, in a case where an electronic certificate to be used when the multifunction peripheral 100 provides a server service for performing TLS communication as a web server, and an electronic certificate to be used by the multifunction peripheral 100 to perform client communication using IEEE 802.1X are different from each other, both electronic certificates can be set. Alternatively, a single electronic certificate may be automatically applied to all communication purposes.

Then, in step S424, the multifunction peripheral 100 transmits to the PC 103 HTML data of a web page screen generated in step S423 and illustrated in FIG. 13B or 14A. According to the result of the certificate issuance request, a character string indicating the setting result is displayed as illustrated in a character string 1308 in FIG. 13B or a character string 1401 in FIG. 14A. FIG. 13B illustrates an example of a screen in a case where the issuance and the acquisition of the certificate are successful. FIG. 14A illustrates an example of a screen in a case where the issuance and the acquisition of the certificate are failed.

If the issuance and the acquisition of the certificate are thus successful, then in the process of step S423, the electronic certificate data is saved, and the purpose of the electronic certificate data is set. When the multifunction peripheral 100 is started, the communication control unit 303 according to the first exemplary embodiment acquires data of an electronic certificate to be used in encrypted communication using TLS, IPSEC, or IEEE 802.1X. Thus, if the purpose is changed, it is necessary to restart the multifunction peripheral 100.

Figure 8B:
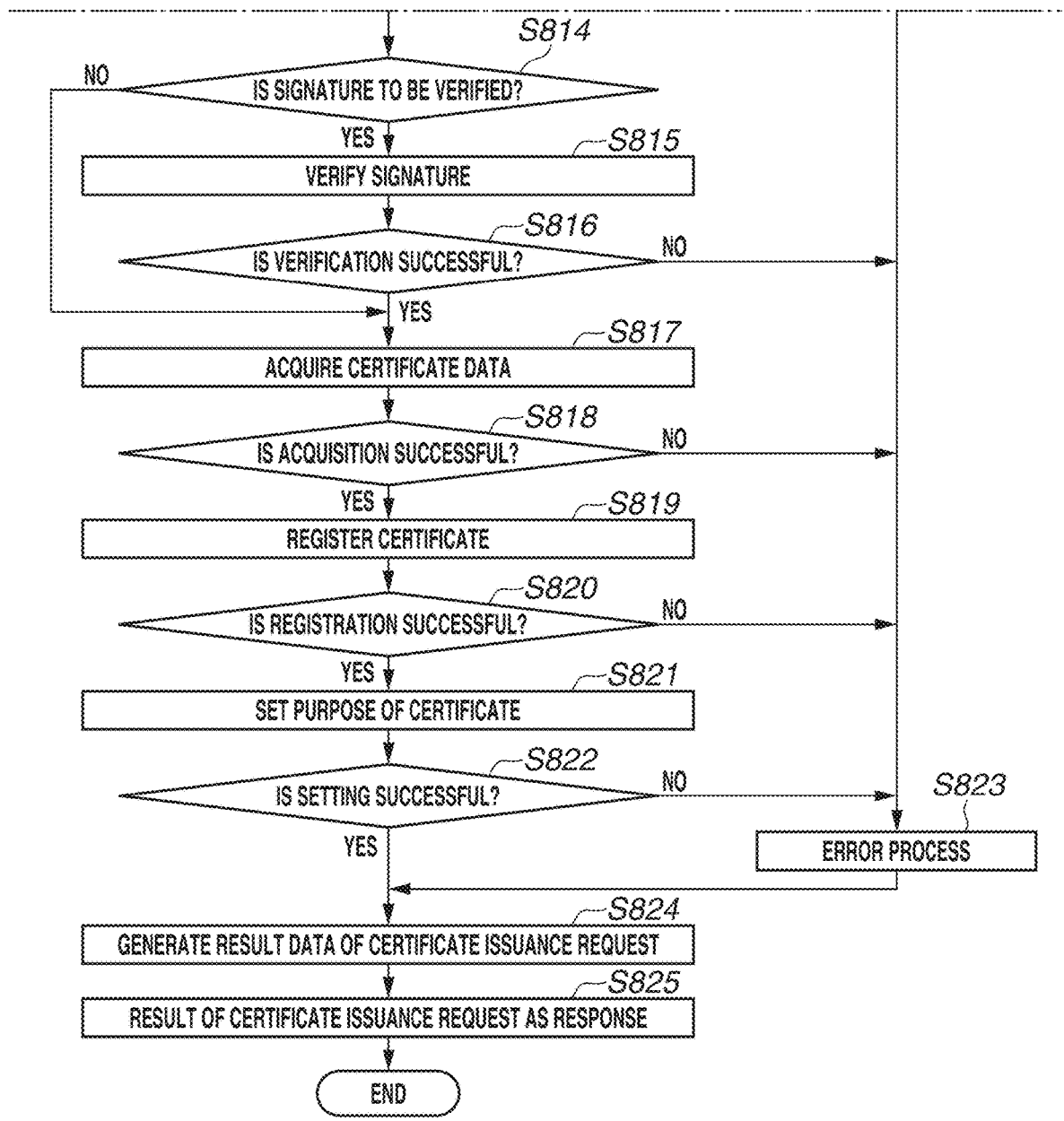
FIG. 8 (including FIGS. 8A and 8B) is a flowchart illustrating a process of making a certificate issuance request and acquiring a certificate in steps S419 to S424 in FIG. 4, which is performed by the multifunction peripheral according to the first exemplary embodiment.

FIG. 8 (including FIGS. 8A and 8B) is a flowchart illustrating the process of making a certificate issuance request and acquiring a certificate in steps S419 to S424 in FIG. 4, which is performed by the multifunction peripheral 100 according to the first exemplary embodiment. This processing is achieved by the CPU 201 executing a program loaded into the RAM 203.

First, in step S801, the CPU 201 receives from the PC 103 a certificate issuance request.

Next, in step S802, the CPU 201 acquires information about the "name" 1301 of a certificate, the "length of key" 1302, the "input of issuance destination information" 1303, the "signature verification" 1304, and the "purpose of key" 1305 included in the certificate issuance request received in step S801.

Next, in step S803, the CPU 201 acquires the CA certificate acquired in steps S412 to S415 in FIG. 4.

Then, in step S804, the CPU 201 generates a key pair/certificate signing request. In step S804, based on the information of the "name" 1301 and the "length of key" 1302 acquired in step S802, the CPU 201 performs the process of generating a key pair. Further, the encryption processing unit 306 generates certificate signing request data in PKCS #10 format based on the information of the "input of issuance destination information" 1303 and the "password" 1306. PKCS #10 is a format for a certificate signing request defined in RFC 2986: PKCS #10: Certification Request Syntax Specification. Further, a certificate signing request is occasionally referred to as a "CSR".

Next, in step S805, the CPU 201 determines whether the generation of the key pair/certificate signing request in step S804 is successful. If it is determined that the generation is successful (YES in step S805), the processing proceeds to step S806. If the generation is failed (NO in step S805), the processing proceeds to step S823.

In step S806, the CPU 201 generates certificate issuance request data. The issuance request data generated in step S806 is based on the connection settings for connection to the certificate/registration authority 102 acquired in step S407 in FIG. 4 and is data in PKCS #7 format defined by SCEP.

Next, in step S808, based on the connection settings for connection to the certificate/registration authority 102 acquired in step S407 in FIG. 4, the CPU 201 connects to the certificate/registration authority 102 as the SCEP server using the TCP/IP protocol. Next, in step S809, the CPU 201 determines whether the connection in step S808 is successful. If the connection is successful (YES in step S809), the processing proceeds to step S810. If the connection is failed (NO in step S809), the processing proceeds to step S823.

In step S810, using a GET or POST method of the HTTP protocol, the CPU 201 transmits the certificate issuance request data generated in step S806. Then, in step S811, the CPU 201 determines whether the transmission in step S810 is successful. If the transmission is successful (YES in step S811), the processing proceeds to step S812. If the transmission is failed (NO in step S811), the processing proceeds to step S823.

In step S812, the CPU 201 receives, from the certificate/registration authority 102, response data in response to the certificate issuance request. The response data transmitted as a response is data in PKCS #7 format defined by SCEP.

Next, in step S813, the CPU 201 determines whether the reception of the response data in step S812 is successful. If the reception is successful (YES in step S813), the processing proceeds to step S814. If the reception is failed (NO in step S813), the processing proceeds to step S823.

In step S814, based on the setting of the "signature verification" 1304 acquired in step S802, the CPU 201 determines whether a setting is made so that the signature is to be verified. If a setting is made so that the signature is to be verified (YES in step S814), the processing proceeds to step S815. If a setting is made so that the signature is not to be verified (NO in step S814), the processing proceeds to step S817.

In step S815, using the public key included in the CA certificate acquired in step S803, the CPU 201 verifies signature data assigned to the data received in step S812. Then, in step S816, the CPU 201 determines whether the verification of the signature in step S815 is successful. If the verification is successful (YES in step S816), the processing proceeds to step S817. If the verification is failed (NO in step S816), the processing proceeds to step S823.

In step S817, the CPU 201 analyzes the data received in step S812 and acquires data of a certificate included in the response data. At this time, the encryption processing unit 306 performs the process of analyzing the response data and acquiring the certificate.

Next, in step S818, the CPU 201 determines whether the acquisition of the certificate in step S817 is successful. If the acquisition is successful (YES in step S818), the processing proceeds to step S819. If the acquisition is failed (NO in step S818), the processing proceeds to step S823.

In step S819, the CPU 201 registers the certificate acquired in step S818 as an electronic certificate corresponding to the key pair generated in step S804. At this time, the CPU 201 causes the key pair/certificate management unit 307 to save the public key pair generated in step S804 and the acquired electronic certificate in a predetermined directory of the HDD 204 for storing a key pair and an electronic certificate. At this time, the key pair/certificate management unit 307 adds information about the public key pair generated in step S804 and the acquired electronic certificate to a list of detailed information of key pairs and certificates as illustrated in FIG. 17B. In FIG. 17B, a key pair and a certificate Xyz4 are newly added.

Next, in step S820, the CPU 201 determines whether the process of registering the certificate in step S819 is successful. If the registration process is successful (YES in step S820), the processing proceeds to step S821. If the registration process is failed (NO in step S820), the processing proceeds to step S823.

In step S821, based on the information of the "purpose of key" 1305 acquired in step S802, the CPU 201 sets the purpose of the certificate. At this time, the key pair/certificate management unit 307 updates information of the purpose in the list of detailed information of key pairs and certificates as illustrated in FIG. 17C, for example. In FIG. 17C, a key pair and a certificate to be used for TLS are changed from Xyz1 to Xyz4.

Next, in step S824, according to the processing results in steps S801 to S823, the CPU 201 generates HTML data of the result of the certificate issuance request illustrated in FIG. 13B. Then, in step S825, the CPU 201 transmits to the PC 103 the HTML data generated in step S824 as a response to the certificate issuance request in step S801, and this processing ends. Then, the processing proceeds to step S425 in FIG. 4.

The processes of steps S419 to S424 and S801 to S825 are control regarding the process of making an electronic certificate issuance request and receiving an electronic certificate, and the setting of a communication purpose, which is performed by the multifunction peripheral 100. In the first exemplary embodiment, the process of making an electronic certificate issuance request and receiving an electronic certificate, and the setting of a communication purpose are collectively referred to as "an electronic certificate automatic update function".

With this electronic certificate automatic update function, the multifunction peripheral 100 can automatically perform the process of making an electronic certificate issuance request and receiving an electronic certificate via the network 110. Further, the multifunction peripheral 100 can also set the purpose of the received electronic certificate. Thus, it is possible to save the user the trouble of working. The description returns to FIG. 4.

In step S425, the multifunction peripheral 100 receives a request to restart the multifunction peripheral 100. In the first exemplary embodiment, the administrator of the multifunction peripheral 100 restarts the multifunction peripheral 100. Thus, the administrator clicks a "restart" button 1309 in FIG. 13B.

Next, in step S426, the multifunction peripheral 100 transmits HTML data of a predetermined restart execution screen illustrated in FIG. 14B as a response to step S425. Next, in step S427, the multifunction peripheral 100 executes the process of restarting the multifunction peripheral 100.

It is assumed that when the purpose of communication using IEEE 802.1X is set for a received electronic certificate, the multifunction peripheral 100 according to the first exemplary embodiment cannot reflect the set purpose unless being restarted. This is because an electronic certificate for, for example, IEEE 802.1X is loaded into the RAM 203 when the multifunction peripheral 100 is started, and the electronic certificate continues to be used. Thus, the electronic certificate may not be replaced with a received electronic certificate saved in the HDD 204. If, however, the multifunction peripheral 100 can switch an electronic certificate to be used in the purpose of communication without needing to restart the multifunction peripheral 100, it may not be necessary to restart the multifunction peripheral 100. For example, if an electronic certificate is set for the purpose of TLS, it may not be necessary to restart the multifunction peripheral 100. For example, the necessity of a restart may be set in advance for each of a plurality of purposes, and according to information regarding the necessity of a restart, the multifunction peripheral 100 may automatically determine whether the multifunction peripheral 100 is to be restarted.

FIG. 9 is a flowchart illustrating a process regarding the restart of the multifunction peripheral 100 in steps S424 to S427 in FIG. 4, which is performed by the multifunction peripheral 100 according to the first exemplary embodiment. This processing is achieved by the CPU 201 executing a program loaded into the RAM 203.

First, in step S901, the CPU 201 receives from the PC 103 a restart request to restart the multifunction peripheral 100. Next, in step S902, the CPU 201 transmits, to the PC 103, HTML data of a predetermined screen for making a restart request to restart the multifunction peripheral 100 illustrated in FIG. 14B as a response to step S901. Next, in step S903, the CPU 201 instructs the device control unit 310 to start a restart process, and this processing ends.

By the above series of operations, after being restarted, the multifunction peripheral 100 uses the electronic certificate acquired from the certificate/registration authority 102.

FIG. 15 is a diagram illustrating an example of a screen in a case where the list of key pairs and electronic certificates is displayed again by the process of step S401 after the issuance and the acquisition of the electronic certificate are successful. In this case, information 1501 of the certificate (Xyz4) issued by the certificate/registration authority 102 is added.

FIG. 18 is a diagram illustrating an example of a setting screen (hereinafter referred to as "an update reservation setting screen") regarding the update of an electronic certificate held in the multifunction peripheral 100 according to the first exemplary embodiment. This setting screen is displayed as an RUI on a display screen of the PC 103, similarly to other screens. The update timing of an electronic certificate can be set through the update reservation setting screen. Further, on the update reservation setting screen, an electronic certificate that should be deleted among one or more electronic certificates stored in the HDD 204 can be set.

In the first exemplary embodiment, an example is described where, as a method for setting the update timing of an electronic certificate, a setting method can be selected from among settings 1801, 1802, and 1803. In the present exemplary embodiment, the settings 1801, 1802, and 1803 are collectively referred to as "certificate update reservation settings".

The setting 1801 is a setting for specifying the date and time when an electronic certificate is to be updated, thereby specifying the update timing of the electronic certificate. If the current date and time measured by a time measurement unit of the multifunction peripheral 100 reach set date and time, the multifunction peripheral 100 executes the electronic certificate automatic update function.

The setting 1802 is a setting for specifying the number of days until the expiration date of an electronic certificate that is being used, thereby specifying the update timing of the electronic certificate. If the current date and time measured by the time measurement unit of the multifunction peripheral 100 reach or pass the date and time before the expiration date by a specified number of days, the multifunction peripheral 100 executes the electronic certificate automatic update function.

The setting 1803 is a setting for setting the cycle in which the electronic certificate automatic update function is to be executed, thereby specifying the update timing of an electronic certificate. In the first exemplary embodiment, this cycle can be set to the number of days, a predetermined date every month, or a predetermined date every year. If a period corresponding to the set cycle elapses after the electronic certificate is updated, the electronic certificate automatic update function is executed. If the certificate update reservation settings are updated, the CPU 201 saves the updated certificate update reservation settings in the HDD 204.

FIG. 18 illustrates an example where the setting 1802 for, based on the expiration date described in an electronic certificate, determining the update timing of the electronic certificate is made. 14 days before the expiration date, the multifunction peripheral 100 executes the certificate automatic update function. FIG. 18 is merely an example, and a method for setting the timing of the automatic update may be another specifying method. The present disclosure is not particularly limited.

The multifunction peripheral 100 according to the present exemplary embodiment has deletion settings 1804 as settings for automatically deleting an unnecessary certificate after the update. In the example of FIG. 18, the user makes a deletion setting by selecting either of a radio button 18041 for specifying a certificate to be automatically deleted, and a radio button 18042 for specifying a certificate not to be automatically deleted. The user only needs to be able to specify whether an unnecessary certificate is to be automatically deleted, and the setting method is not particularly limited. The selection may be made using not only radio buttons but also a pull-down menu. Alternatively, the on/off state of a certificate automatic deletion function may be set.

In a case where the setting for executing automatic deletion is enabled, a check box 18043 and check boxes 1805 can be selected.

By selecting the check box 18043, it is possible to enable a setting for deleting an electronic certificate in a case where the number of stored electronic certificates reaches a predetermined upper limit. In a case where the check box 18043 is selected, and if an electronic certificate is to be acquired, and also if the number of electronic certificates stored in the HDD 204 is a predetermined number or more, an electronic certificate is automatically deleted.

If the remaining storage capacity of an area reserved as a storage area for storing electronic certificates reaches a predetermined value or less, an electronic certificate may be deleted.

Further, by selecting the check boxes for detailed settings 1805, it is possible to make detailed settings of automatic deletion. A setting method for making these settings is not limited to check boxes.

In a case where the check box 18043 is not selected, and if a condition specified by any of the automatic deletion detailed settings 1805 is satisfied, a certificate is deleted, regardless of the number of stored electronic certificates.

The automatic deletion detailed settings 1805 include settings 18051 to 18055. An electronic certificate set by the detailed settings 1805 as an electronic certificate that should be deleted is automatically deleted from the HDD 204 according to the acquisition of a new electronic certificate.

In a case where the setting 18051 is enabled, an electronic certificate before the update having the same purpose as the purpose of an electronic certificate to be newly acquired is set as an electronic certificate that should be automatically deleted. The purpose of an electronic certificate is set using the "purpose of key" 1305 in FIG. 13A. In this case, the purpose of the electronic certificate corresponds to, for example, the use of the electronic certificate for TLS communication, or the use of the electronic certificate for Secure Sockets Layer (SSL) communication. The purpose of the electronic certificate is managed in association with the electronic certificate.

In a case where the setting 18052 is enabled, and if the purpose of an electronic certificate among electronic certificates held in the multifunction peripheral 100 before the update is not set, it is determined that the electronic certificate is not used, and the electronic certificate is set as an electronic certificate that should be deleted.

In a case where the setting 18053 is enabled, a self-certificate held in the multifunction peripheral 100 before the update is set as an electronic certificate that should be deleted. The self-certificate is a certificate that is not signed by the certificate authority, and is electronically signed by the information processing apparatus itself that holds the certificate. The condition is set such that a certificate other than a self-certificate is not deleted, assuming a case where the multifunction peripheral 100 may hold a certificate purchased from outside the multifunction peripheral 100, and it is not possible to determine whether it is all right to automatically delete the certificate.

In a case where the setting 18054 is enabled, an electronic certificate held in the multifunction peripheral 100 before the update and set before the multifunction peripheral 100 is shipped from the factory is set as an electronic certificate that should be deleted. The condition is set such that an electronic certificate other than an electronic certificate set before the multifunction peripheral 100 is shipped from the factory is not deleted, assuming a case where it is not possible to determine whether it is all right to automatically delete an electronic certificate held later in the multifunction peripheral 100.

In a case where the setting 18055 is enabled, among electronic certificates held in the multifunction peripheral 100 before the update, an expired electronic certificate is set as an electronic certificate that should be deleted. This is because an expired electronic certificate cannot be used.

The CPU 201 saves these setting values in the HDD 204. The above settings are made by selecting check boxes. The present invention, however, is not limited to this. It is sufficient to be able to specify each setting item as enabled or disabled. For example, each setting item may be selected as enabled or disabled, using a pull-down menu or a radio button.

In the present exemplary embodiment, certificate automatic deletion settings can be made through the update reservation setting screen in FIG. 18. Alternatively, the same settings may be able to be made through the certificate issuance request screen in FIG. 13A. The present disclosure is not particularly limited.

Figure 19:
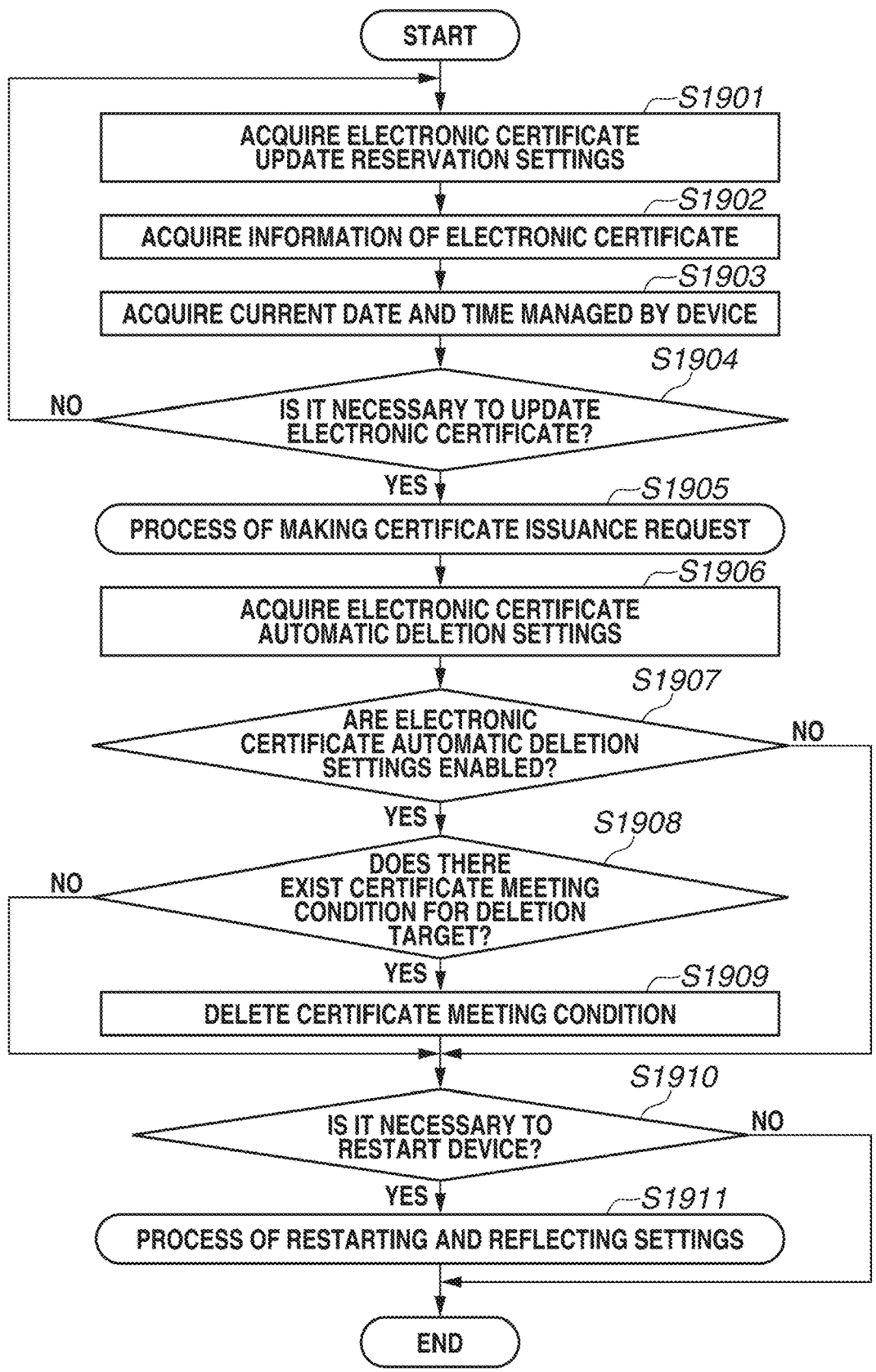
FIG. 19 is a flowchart illustrating a process of executing an electronic certificate automatic update function and an electronic certificate automatic deletion function based on electronic certificate update reservation settings, which is performed by the multifunction peripheral according to the first exemplary embodiment.

With reference to FIG. 19, a description is given of a process in which the multifunction peripheral 100 executes the electronic certificate automatic update function based on the electronic certificate update reservation settings. This processing is achieved by the CPU 201 executing a program loaded into the RAM 203.

First, in step S1901, the CPU 201 acquires the electronic certificate update reservation settings from the HDD 204.

Next, in step S1902, the CPU 201 acquires information of an electronic certificate that is currently used. This information corresponds to, for example, information stored in tables illustrated in FIGS. 17A to 17C.

Next, in step S1903, the CPU 201 acquires the current date and time managed by the multifunction peripheral 100.

Then, in step S1904, the CPU 201 compares the electronic certificate update reservation settings with the information of the electronic certificate and determines whether it is necessary to update the electronic certificate currently in use. This determination is made according to a setting selected among the settings 1801, 1802, and 1803 illustrated in FIG. 18. If it is determined that it is not necessary to update the electronic certificate (NO in step S1904), the processing returns to step S1901.

On the other hand, if it is determined that it is necessary to update the electronic certificate (YES in step S1904), the processing proceeds to step S1905, and the control of the certificate issuance request process illustrated in FIG. 8 (including FIGS. 8A and 8B) is performed. Then, if the certificate issuance request process is completed, the processing proceeds to step S1906.

In step S1906, the CPU 201 acquires from the HDD 204 the electronic certificate automatic deletion settings described with reference to FIG. 18.

Next, in step S1907, the CPU 201 determines whether the electronic certificate automatic deletion settings are enabled. If it is determined that the electronic certificate automatic deletion settings are not enabled (NO in step S1907), the processing proceeds to step S1910. For example, if the radio button 18041 in FIG. 18 is selected, it is determined that the electronic certificate automatic deletion settings are enabled.

If it is determined in step S1907 that the electronic certificate automatic deletion settings are enabled (YES in step S1907), then in step S1908, the CPU 201 determines whether there exists a certificate meeting a condition for a deletion target.

In step S1908, the CPU 201 determines whether there exists a certificate as a deletion target among all the electronic certificates stored in the multifunction peripheral 100. Based on the settings described with reference to FIG. 18, the CPU 201 determines whether each electronic certificate is set as a deletion target. For example, in a case where the check box 18043 is selected, if the number of electronic certificates stored in the multifunction peripheral 100 reaches the predetermined upper limit and if an electronic certificate satisfies a condition specified by any of the detailed settings 1805, the electronic certificate is set as a deletion target. Further, for example, in a case where the check box 18043 is not selected, an electronic certificate satisfying a condition specified by any of the detailed settings 1805 is set as a deletion target, regardless of whether the number of electronic certificates stored in the multifunction peripheral 100 reaches the upper limit.

If it is determined in step S1908 that there exists a certificate as a deletion target (YES in step S1908), the processing proceeds to step S1909. In step S1909, the CPU 201 deletes the electronic certificate as the deletion target in the HDD 204. Then, the processing proceeds to step S1910. If it is determined in step S1908 that there exists no electronic certificate as a deletion target (NO in step S1908), the processing proceeds to step S1910.

In this manner, if an electronic certificate is to be acquired from an external apparatus such as the certificate/registration authority 102, then according to settings, it is possible to delete an electronic certificate that should be deleted.

In the present exemplary embodiment, after an electronic certificate is acquired from the certificate/registration authority 102 and the purpose of the electronic certificate is set, an electronic certificate that should be deleted is deleted.

Alternatively, an electronic certificate may be acquired from the certificate/registration authority 102 after the electronic certificate is deleted in step S1909.

According to the above exemplary embodiment, it is possible to automatically delete a certificate according to a particular condition even if a user does not manually give an instruction to delete an electronic certificate. Thus, even if the number of electronic certificates that can be stored in a multifunction peripheral is limited, it is possible to automatically update an electronic certificate while saving the user the trouble of deleting an electronic certificate.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-113631, filed Jun. 8, 2017, which is hereby incorporated by reference herein in its entirety.

What is claimed is:

1. An information processing apparatus comprising:
one or more memories configured to store one or more electronic certificates of respective public key; and
one or more processors configured to:
store one or more electronic certificates in the one or more memories;
transmit a request for an issuance of an electronic certificate to an external apparatus;
receive, from the external apparatus, the electronic certificate that is issued on the basis of the transmitted request; and
delete an electronic certificate associated with an usage of an encrypted communication that is the same as an usage of an encrypted communication associated with the received electronic certificate, from among one or more electronic certificates stored in the one or more memories, based on a predetermined setting related to deletion of an electronic certificate.

2. The information processing apparatus according to claim 1, wherein the one or more processors are further configured to:
delete an electronic certificate not associated with the encrypted communication function, from among the one or more electronic certificates stored in the one or more memories.

3. The information processing apparatus according to claim 1, wherein the one or more processors are further configured to:
delete an electronic certificate which is a self-certificate, from among the one or more electronic certificates stored in the one or more memories.

4. The information processing apparatus according to claim 1, wherein the one or more processors are further configured to:
delete an electronic certificate stored in advance in the information processing apparatus before the information processing apparatus is shipped from a factory, from among the one or more electronic certificates stored in the one or more memories.

5. The information processing apparatus according to claim 1, wherein the one or more processors are further configured to:
delete an expired electronic certificate, from among the one or more electronic certificates stored in the one or more memories.

6. The information processing apparatus according to claim 1, wherein the one or more processors are further configured to:
delete an electronic certificate according to an instruction from a user, from among the one or more electronic certificates stored in the one or more memories.

7. The information processing apparatus according to claim 1, wherein the one or more processors are further configured to:
delete the electronic certificate after the encrypted communication function of the electronic certificate received from the external apparatus is set.

8. The information processing apparatus according to claim 1, wherein the one or more processors are further configured not to delete the electronic certificate associated with the encrypted communication function that is the same as the encrypted communication function associated with the received electronic certificate, from among the one or more electronic certificates stored in the one or more memories, in a case where a setting to delete the one or more electronic certificates stored in the one or more memories in accordance with the receipt of the electronic certificate is not set.

9. The information processing apparatus according to claim 8, wherein the one or more processors are further configured to:
in a case where a number of electronic certificates stored in the one or more memories is a predetermined number or more, delete the electronic certificate associated with the encrypted communication function that is the same as the encrypted communication function associated with the received electronic certificate.

10. The information processing apparatus according to claim 1, wherein the usage of the encrypted communication is at least one of TLS, IPSEC and IEEE802.1X.

11. The information processing apparatus according to claim 1, wherein the one or more processors are further configured to:
communicate with an apparatus connected to the information processing apparatus using the encrypted communication function set.

12. The information processing apparatus according to claim 1, wherein the one or more processors are further configured to:
delete an electronic certificate associated with the same purpose as a purpose of the received electronic certificate.

13. A control method for controlling an information processing apparatus for performing communication using an electronic certificate of a public key, the control method comprising:
storing one or more electronic certificates in one or more memories configured to store one or more electronic certificates of respective public key;
transmitting a request for an issuance of the electronic certificate to an external apparatus;
receiving, from the external apparatus, the electronic certificate that is issued on the basis of the transmitted request; and
deleting an electronic certificate associated with an usage of an encrypted communication that is the same as an usage of an encrypted communication associated with the received electronic certificate, from among one or more electronic certificates stored in the one or more memories, based on a predetermined setting related to deletion of an electronic certificate.

14. A non-transitory computer readable storage medium storing a program for causing a computer to execute a control process for controlling an information processing apparatus for performing communication using an electronic certificate of a public key, the control process comprising:
   storing one or more electronic certificates in one or more memories configured to store one or more electronic certificates of respective public key;
   transmitting a request for an issuance of the electronic certificate to an external apparatus;
   receiving, from the external apparatus, the electronic certificate that is issued on the basis of the transmitted request; and
   deleting an electronic certificate associated with an usage of an encrypted communication that is the same as an usage of an encrypted communication associated with the received electronic certificate, from among one or more electronic certificates stored in the one or more memories, based on a predetermined setting related to deletion of an electronic certificate.

* * * * *